(12) United States Patent
Wang et al.

(10) Patent No.: US 10,449,599 B2
(45) Date of Patent: Oct. 22, 2019

(54) TRACK LINK AND METHOD FOR MANUFACTURING TRACK LINK

(71) Applicant: KOMATSU LTD., Tokyo (JP)

(72) Inventors: Tao Wang, Hirakata (JP); Naoaki Kita, Hirakata (JP)

(73) Assignee: KOMATSU LTD., Tokyo (JP)

( * ) Notice: Subject to any disclaimer, the term of this patent is extended or adjusted under 35 U.S.C. 154(b) by 5 days.

(21) Appl. No.: 15/557,257

(22) PCT Filed: Oct. 20, 2015

(86) PCT No.: PCT/JP2015/079613
§ 371 (c)(1),
(2) Date: Sep. 11, 2017

(87) PCT Pub. No.: WO2017/068656
PCT Pub. Date: Apr. 27, 2017

(65) Prior Publication Data
US 2018/0050385 A1    Feb. 22, 2018

(51) Int. Cl.
*B21K 23/02* (2006.01)
*B62D 55/20* (2006.01)
(Continued)

(52) U.S. Cl.
CPC .............. *B21K 23/02* (2013.01); *B21J 5/027* (2013.01); *B62D 55/20* (2013.01); *B62D 55/21* (2013.01); *B62D 55/28* (2013.01)

(58) Field of Classification Search
CPC .......... B21K 23/02; B21J 5/027; B62D 55/21; B62D 55/20; B62D 55/28
(Continued)

(56) References Cited

U.S. PATENT DOCUMENTS 4,449,357 A   5/1984   Balitch
5,288,184 A   2/1994   Heule
(Continued)

FOREIGN PATENT DOCUMENTS

CN    1081404 A    2/1994
CN    101400460 A    4/2009
(Continued)

OTHER PUBLICATIONS

The Office Action for the corresponding Chinese application No. 201580077340.7, dated Dec. 14, 2018.
(Continued)

*Primary Examiner* — S. Joseph Morano
*Assistant Examiner* — Jean W Charleston
(74) *Attorney, Agent, or Firm* — Global IP Counselors, LLP

(57) ABSTRACT

A track link includes a tread surface, a shoe surface, a communicating part, and a seat formation part. The tread surface comes into contact with a roller for an undercarriage. The shoe surface is disposed on an opposite side from the tread surface. A track shoe is attachable to the shoe surface. The communicating part is disposed between the shoe and tread surfaces. The communicating part passes through the track link in a width direction that is perpendicular to a linking direction, and allows side faces of the track link to communicate in the width direction. The seat formation part is formed on a shoe surface side of the communicating part. A through-hole passes through from the shoe surface to the seat formation part, and a bolt member is disposable in the through-hole. A number track links in a loop are usable in a track of a work vehicle.

8 Claims, 21 Drawing Sheets

(51) Int. Cl.
*B62D 55/28* (2006.01)
*B62D 55/21* (2006.01)
*B21J 5/02* (2006.01)

(58) Field of Classification Search
USPC .......................................................... 305/193
See application file for complete search history.

(56) References Cited

U.S. PATENT DOCUMENTS

| | | | | |
|---|---|---|---|---|
| 5,704,697 | A * | 1/1998 | Ketting | B62D 55/12 |
| | | | | 305/193 |
| 7,131,687 | B2 * | 11/2006 | Yokoo | E02F 9/163 |
| | | | | 296/190.08 |
| 9,272,742 | B2 * | 3/2016 | Hisamatsu | B62D 55/21 |
| 2003/0230069 | A1 * | 12/2003 | Okawa | B21J 5/00 |
| | | | | 59/35.1 |
| 2006/0043791 | A1 | 3/2006 | Sho et al. | |
| 2007/0157695 | A1 | 7/2007 | Coelho et al. | |
| 2007/0193323 | A1 | 8/2007 | Coelho et al. | |
| 2008/0284245 | A1 * | 11/2008 | Livesay | B62D 55/14 |
| | | | | 305/193 |
| 2009/0026836 | A1 | 1/2009 | Maeda | |
| 2009/0058182 | A1 * | 3/2009 | Mulligan | B62D 55/12 |
| | | | | 305/193 |
| 2009/0230763 | A1 * | 9/2009 | Sakai | B62D 55/21 |
| | | | | 305/202 |
| 2014/0083782 | A1 | 3/2014 | Brewer et al. | |
| 2014/0152086 | A1 * | 6/2014 | Meyer | B62D 55/21 |
| | | | | 305/142 |
| 2014/0292068 | A1 * | 10/2014 | Hisamatsu | B62D 55/21 |
| | | | | 305/202 |

FOREIGN PATENT DOCUMENTS

| | | |
|---|---|---|
| CN | 101421150 A | 4/2009 |
| CN | 201914345 U | 8/2011 |
| CN | 104703868 A | 6/2015 |
| EP | 0096812 A2 | 12/1983 |
| JP | 58-26685 A | 2/1983 |
| JP | 58-67572 A | 4/1983 |
| JP | 58-101879 A | 6/1983 |
| JP | 59-197336 A | 11/1984 |
| JP | 60-191623 A | 9/1985 |
| JP | 62-46152 U | 3/1987 |
| JP | 62-53392 B2 | 11/1987 |
| JP | 63-90485 A | 4/1988 |
| JP | 2006-89023 A | 4/2006 |
| JP | 2014-46873 A | 3/2014 |
| JP | 2015-151080 A | 8/2015 |
| RU | 2036816 C1 | 6/1995 |

OTHER PUBLICATIONS

The International Search Report for the corresponding international application No. PCT/JP2015/079613, dated Nov. 24, 2015.

* cited by examiner

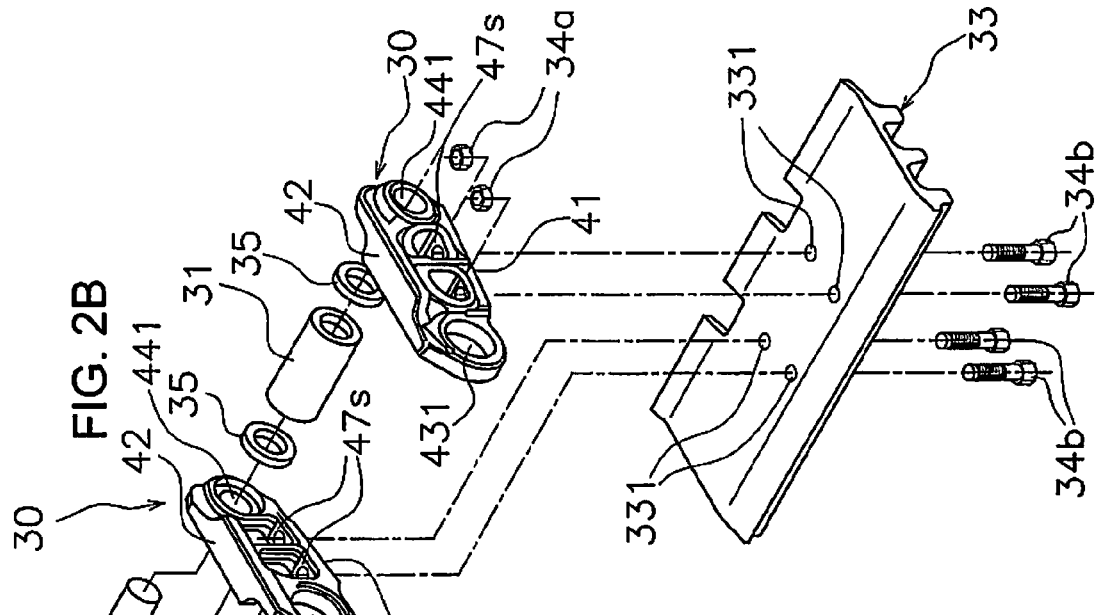
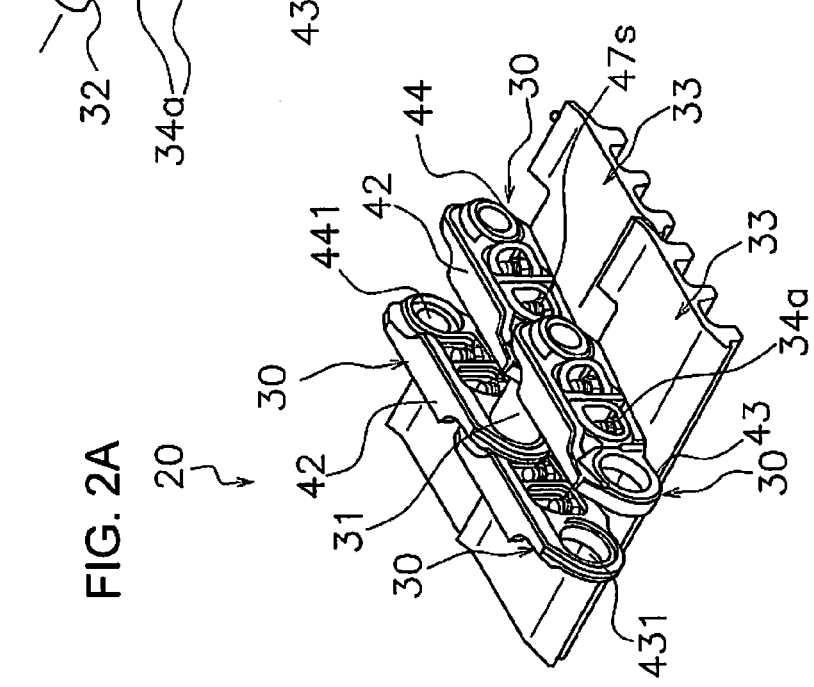

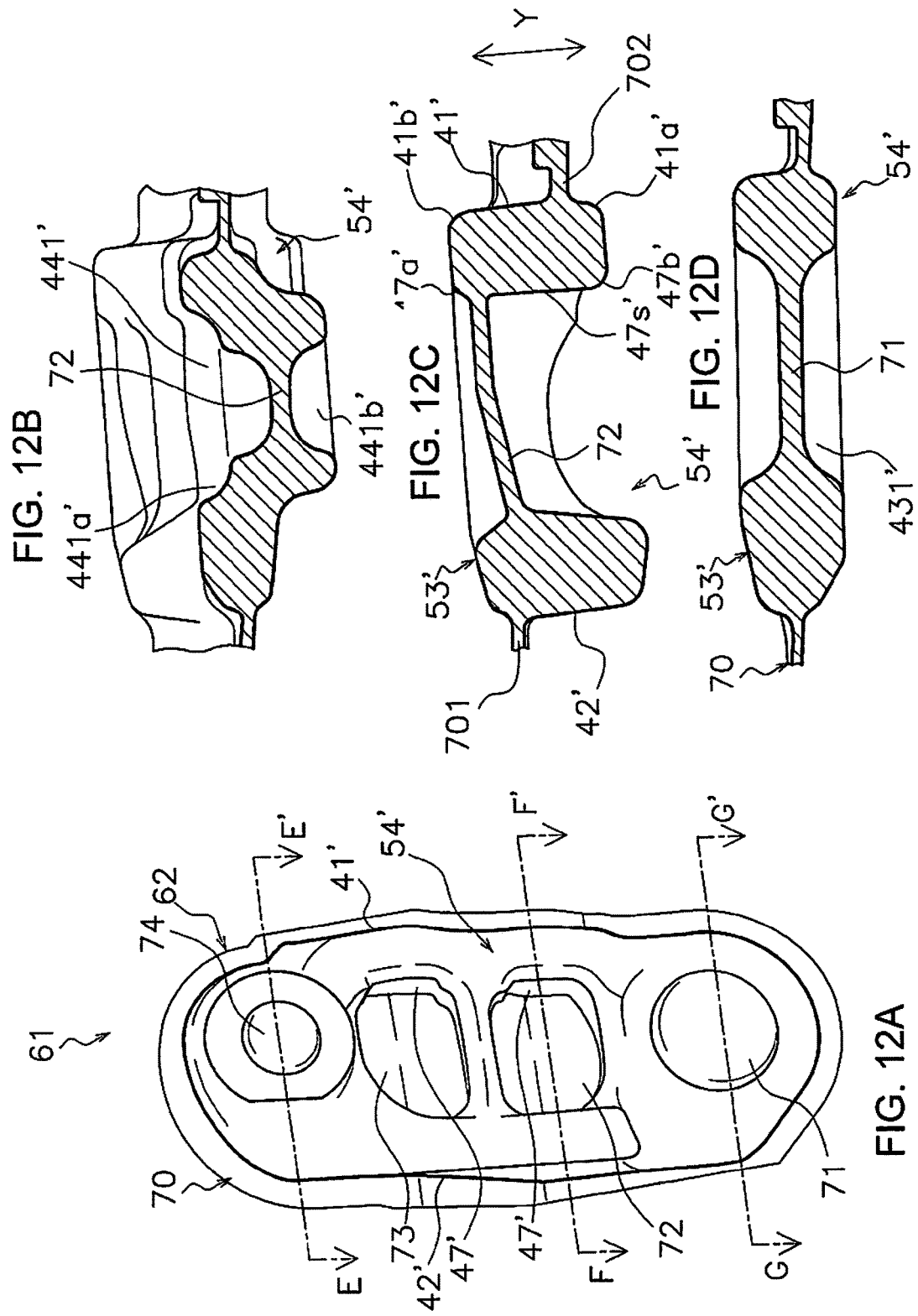

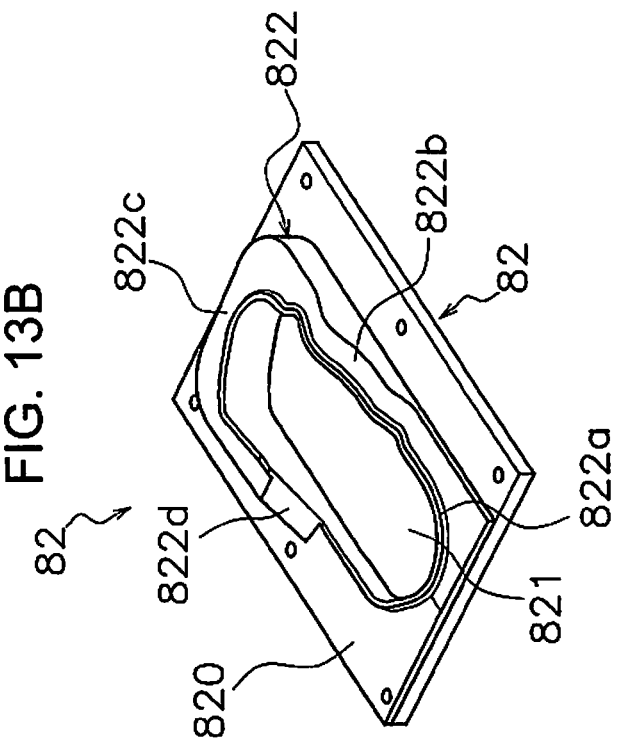
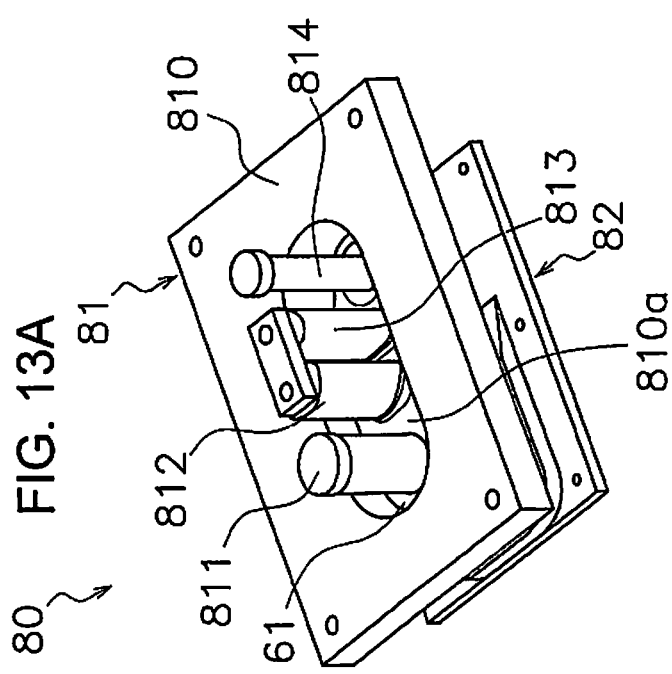
FIG. 13B
FIG. 13A

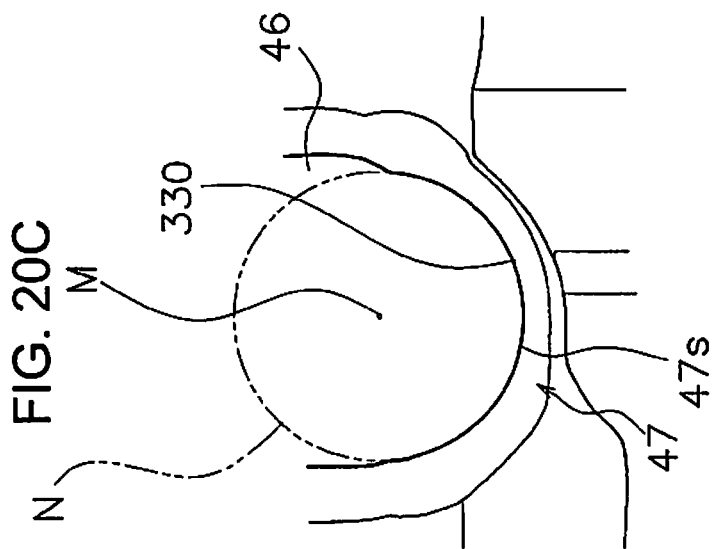
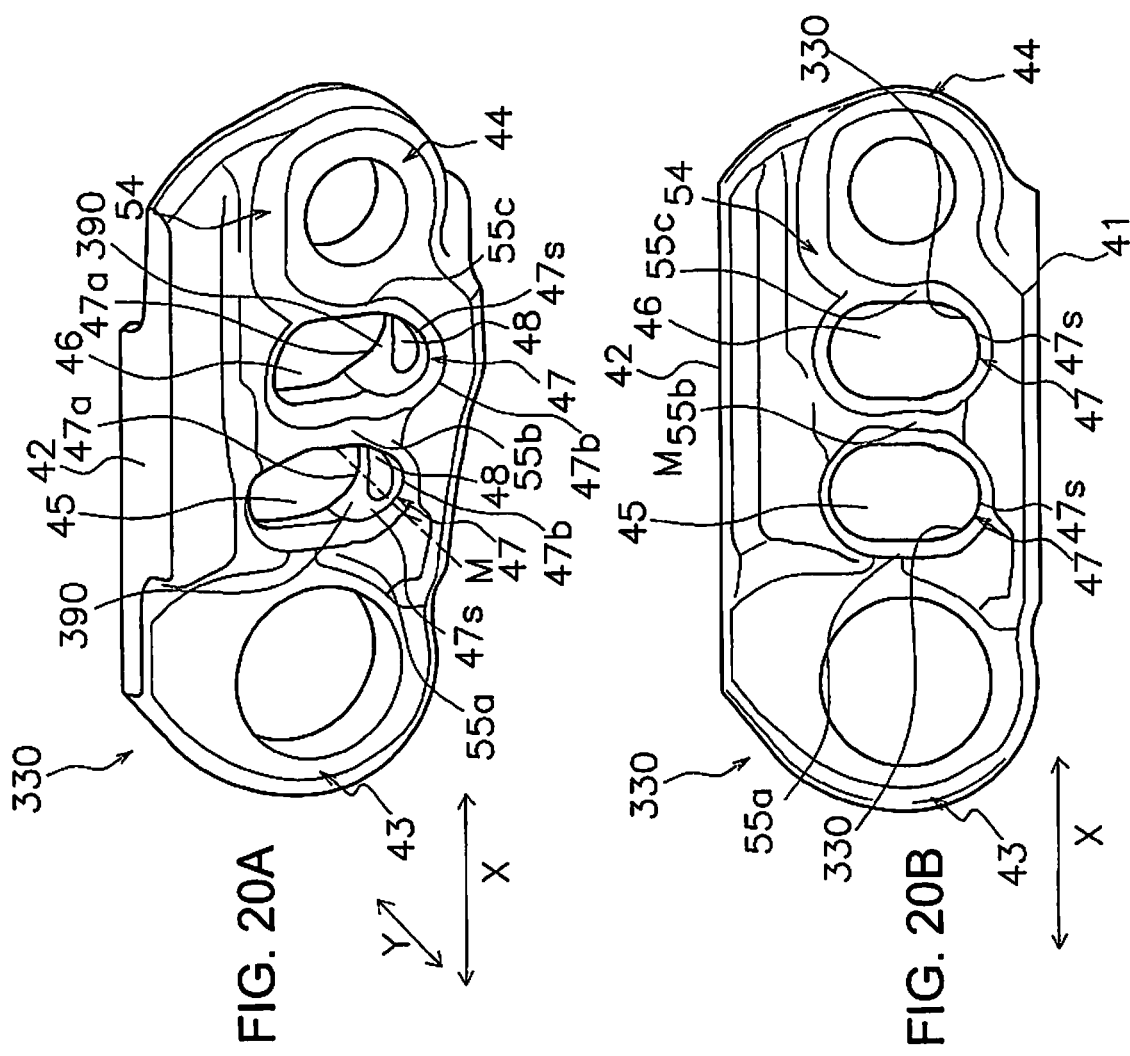

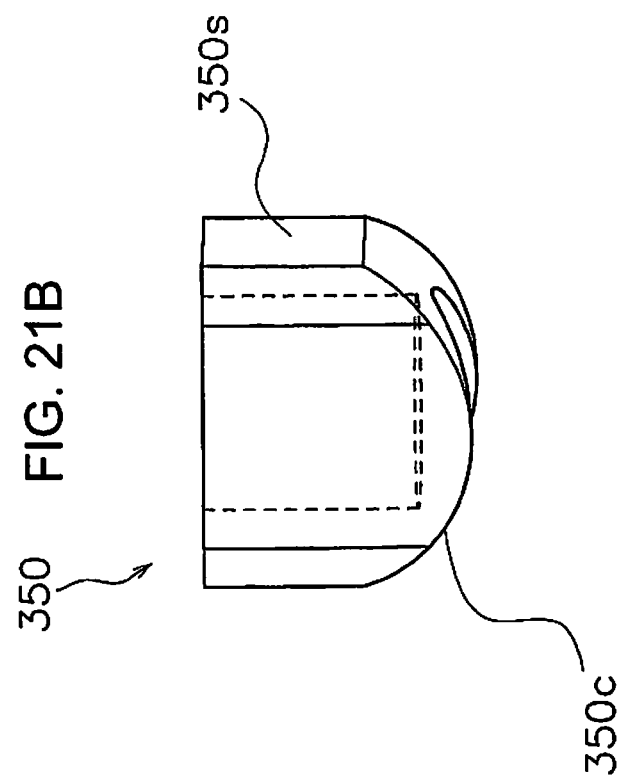
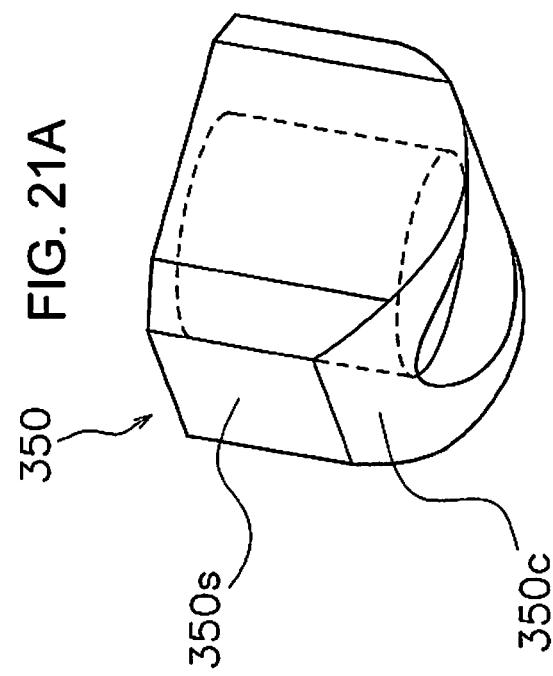

TRACK LINK AND METHOD FOR MANUFACTURING TRACK LINK

CROSS-REFERENCE TO RELATED APPLICATIONS

This application is a U.S. National stage application of International Application No. PCT/JP2015/079613, filed on Oct. 20, 2015.

BACKGROUND

Field of the Invention

The present invention relates to a track link that is used in a work vehicle or the like, and to a method for manufacturing a track link.

Some work vehicles are equipped with a tracked drive unit for travel over uneven ground.

A track has a plurality of track links, track shoes, and the like. A plurality of track links are endlessly linked by pins and bushings, and a track shoe is mounted to each track link (see Japanese Laid-Open Patent Application Nos. 2014-46873 and S58-67572, for example).

With the configuration disclosed in Japanese Laid-Open Patent Application 2014-46873, a track shoe is mounted to a track link by fastening nut members and bolt members. Detents are formed on the seat surfaces of the nut members of the track link to restrict the rotation of the nut members. The peripheral structure of the seat surfaces of the nut members and the seat surfaces of the detents, etc., is formed by performing broaching after forming in a die. In Japanese Laid-Open Patent Application S58-67572, tread surfaces, shoe surfaces, seat surfaces, and so forth are formed without any broaching, merely by cutting off the flash after forging, etc., by forming flash at one corner in the width direction of the tread surfaces, shoe surfaces, and seat surfaces.

SUMMARY

However, with the track link discussed in Japanese Laid-Open Patent Application 2014-46873, since the peripheral structure of the seat surface is formed by broaching, edges are formed, stress is concentrated at these edges during heat treatment, and cracks and the like may occur. With the method discussed in Japanese Laid-Open Patent Application S58-67572, when flash formed at one of the corners in the width direction of the seat surface is cut off, edges are formed at both ends of the cut-off surfaces, and stress may be concentrated there.

It is an object of the present invention to provide a track link and a track link manufacturing method with which stress concentration can be relieved.

The track link pertaining to the first aspect is a track link a number of which are linked in a loop shape for use in a track of a work vehicle, comprising a tread surface, a shoe surface, a communicating part, a seat formation part, and a through-hole. The tread surface is configured to come into contact with a roller for an undercarriage. The shoe surface is provided on an opposite side from the tread surface, and a track shoe is able to be attached to the shoe surface. The communicating part is between the shoe surface and the tread surface, passes through in a width direction that is perpendicular to a linking direction, and is configured to allow side faces of the track link to communicate in the width direction. The seat formation part is formed on the shoe surface side of the communicating part. The through-hole passes through from the shoe surface to the seat formation part, and a bolt member is able to be disposed in the through-hole. The seat formation part has a seat surface and a stepped part. The seat surface has a through-hole formed in them, and a nut member that is linked to the bolt member is disposed on the seat surface. The stepped part is formed opposite the seat surface from at least one of the walls provided on the sides of the communicating part in the linking direction, toward the through-hole. A grain flow is formed toward a position which is on the seat formation part and is near one of the corners at the ends of the seat formation part in the width direction.

The track link according to the second aspect is a first track link, wherein the stepped part restricts a rotation of the nut member.

The track link according to the third aspect is a track link a number of which are linked in a loop shape for use in a track of a work vehicle, comprising a tread surface, a shoe surface, communicating part, a seat formation part, and a through-hole. The tread surface is configured to come into contact with a track roller. The shoe surface is provided on an opposite side from the tread surface, and a track shoe is able to be attached to the shoe surface. The communicating part is provided between the shoe surface and the tread surface, passes through in a width direction that is perpendicular to the linking direction, and is configured to allow side faces of the track link to communicate in the width direction. The seat formation part is formed on the shoe surface side of the communicating part. The through-hole passes through from the shoe surface to the seat formation part, and a bolt member is able to be disposed in the through-hole. The seat formation part has a seat surface and a boss. The seat surface has a through-hole formed in them, and a nut member that is linked to the bolt members are disposed on the seat surface. The boss is formed on the seat formation part, near one of corners at ends of the seat formation part in the linking direction, from walls provided on sides of the communicating part in the linking direction. A grain flow is formed toward a position which is on the seat formation part and is near one of the corners at the ends of the seat formation part in the width direction.

The track link according to the fourth aspect is the track link according to the third aspect, wherein the boss restricts the rotation of the nut members.

The track link according to the fifth aspect is the track link according to the third aspect, further a comprising protrusion. The protrusion is formed protruding outward from the boss. The corner near where the boss is formed on the seat formation part is provided to the protrusion.

The track link according to the sixth aspect is the track link according to the fifth aspect, further comprising a groove trace. The groove trace is formed on an inside of the boss so as to correspond to the protrusion.

The track link according to the seventh aspect is a track link a number of which are linked in a loop shape for use in a track of a work vehicle, comprising a tread surface, a shoe surface, a communicating part, a seat formation part, and a through-hole. The thread surface is configured to come into contact with a track roller. The shoe surface is provided on an opposite side from the tread surface, and a track shoe is able to be attached to the track shoe. The communicating part is provided between the shoe surface and the tread surface, passes through in a width direction that is perpendicular to a linking direction, and is configured to allow side faces of the track link to communicate in the width direction. The seat formation part has a curved surface shape so as to form part of a side face of imaginary circular column having a center axis along the width direction, and is formed on the shoe surface side of the communicating part. The through-hole passes through from the shoe surface to the seat formation parts, and a bolt member is disposed in the through-hole. The seat formation part is such that corners at ends of the seat formation part in the linking direction are formed in a rounded shape. A grain flow is formed toward a position which is on the seat formation part and is near one of the corners at the ends of the seat formation part in the width direction.

The track link according to the eighth aspect is the track link according to the seventh aspect, wherein the seat formation part has a seat surface on which is disposed a nut member that is fastened to the bolt member. The nut member has a shape such that its contacts face with the seat surface matches the curved surface shape.

The track link manufacturing method according to the ninth aspect is a method for manufacturing track link, a number of which are linked into a loop shape for use on a work vehicle, that has a seat formation part that includes a seat surface on which is disposed a nut member to be fixed to a track shoe, and that are formed by forging, the method comprising a formation step and a burr removal step. The formation step involves producing a track link material in which the seat surface is formed at an angle to a forging direction, burrs are formed on the seat formation part near one of the corners at ends of the seat formation part in a width direction that is perpendicular to a linking direction of the track link, and the corners at the ends are formed in a rounded shape. The burr removal step involves removing some or all of the burrs of the track link material formed by the formation step.

The track link manufacturing method according to the tenth aspect is the track link manufacturing method according to the ninth aspect, wherein a trimming die used in the burr removal step has a trimming blade for removing burrs on the seat formation part, and a scraping blade for performing a scraping treatment on the seat surface. In the burr punching step, the scraping treatment is also performed on the seat surfaces.

The track link manufacturing method according to the eleventh aspect is the track link manufacturing method according to the ninth aspect, wherein some of the burr is left behind in the burr removal step so as to restrict a rotation of the nut member.

The track link manufacturing method according to the twelfth aspect is the track link manufacturing method according to the tenth aspect, wherein, in the burr removal step, some of the burr is left behind so a to restrict a rotation of the nut member, and material shaved off of the track link material by the scraping treatment accumulates in a groove formed in a portion of the burrs of the track link material along the seat surface.

The track link manufacturing method according to the thirteenth aspect is the track link manufacturing method according to the tenth aspect, wherein the formation step forms a burr on the shoe surface, which comes into contact with the track shoe and is opposite the seat surface, and closer to a first corner out of a first corner and a second corner at ends in the width direction of the shoe surface. The trimming die has a first die having a trimming blade and a scraping blade, and a second die corresponding to the first die. In the burr removal step, the track link material is disposed in the second die so that the first corner is located on the first die side, and the second corner is located on the second die side.

The present invention provides a track link and a method for manufacturing a track, with which the concentration of stress can be relieved.

BRIEF DESCRIPTION OF DRAWINGS

FIG. 2A is an oblique view of the track shown in FIG. 1, and FIG. 2B is an exploded oblique view of FIG. 2A;

FIG. 12A is an oblique view of a molded article produced by the finish shaping in FIG. 8, FIG. 12B is a cross section along the EE' line in FIG. 12A, FIG. 12C is a cross section along the FF' line in FIG. 12A, and FIG. 12D is a cross section along the GG' line in FIG. 12A;

FIG. 13A is an oblique view of a state in which the burr removal and scraping in FIG. 8 are being performed, and FIG. 13B is an oblique view of the first die in FIG. 13A;

FIG. 20A is an oblique view of the track link in a modification example of an embodiment pertaining to the present invention, FIG. 20B is a front view of the track link in FIG. 20A, and FIG. 20C is a detail view of FIG. 20B; and FIGS. 21A and 21B are oblique views of a nut member used for the track link in FIG. 20A.

DETAILED DESCRIPTION OF EMBODIMENT(S)

The method for manufacturing a track link in an embodiment of the present invention, as well as a track link manufactured by this method, will be described through reference to the drawings.

Embodiment 1

1. Configuration 1-1. Crawler Belt

Figure 1:
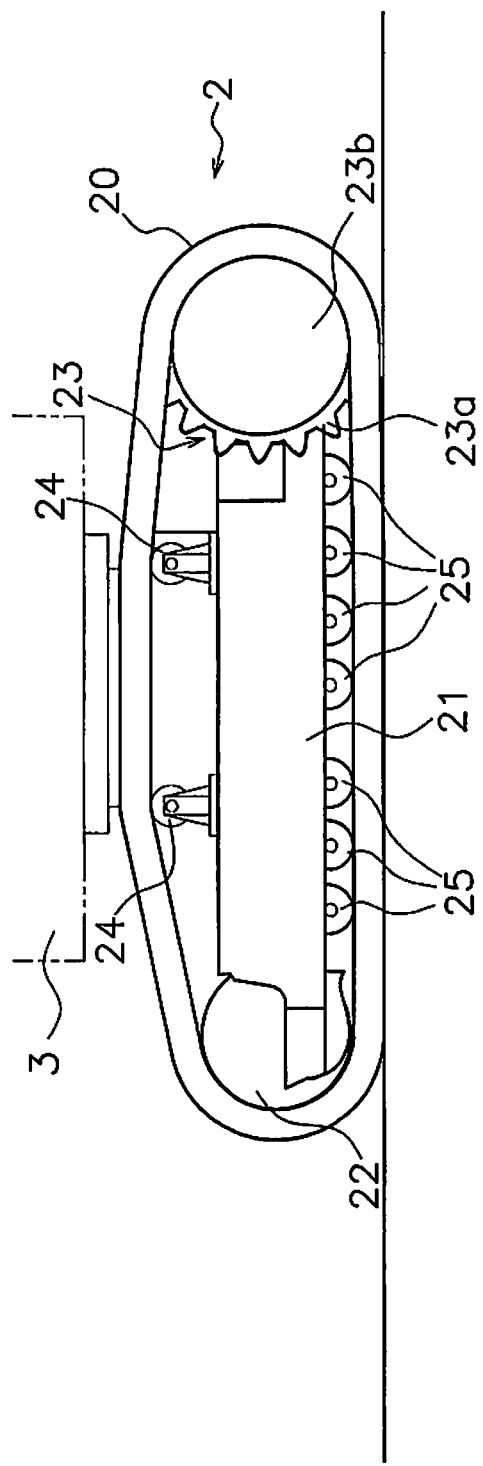
FIG. 1 is a side view showing a traveling vehicle to which a track is attached in an embodiment of the present invention.

FIG. 1 shows a state in which a track 20 is provided to a drive unit 2.

The tracks 20 are provided on the left and right sides of the drive unit 2, and are endless in form. A track frame 21 is arranged along the vehicle longitudinal direction. An idler wheel 22 is rotatably supported at the front end of the track frame 21. A final reduction gear 23b is fixed to the rear end of the track frame 21. Sprocket teeth 23a are attached to the final reduction gear 23b. A plurality of carrier rollers 24 are rotatably provided on the upper part of the track frame 21. A plurality of track rollers 25 are rotatably provided on the lower part of the track frame 21.

The track 20 is wrapped around the idler wheel 22, the sprocket wheel 23, the carrier rollers 24, and the track rollers 25.

Figure 3:
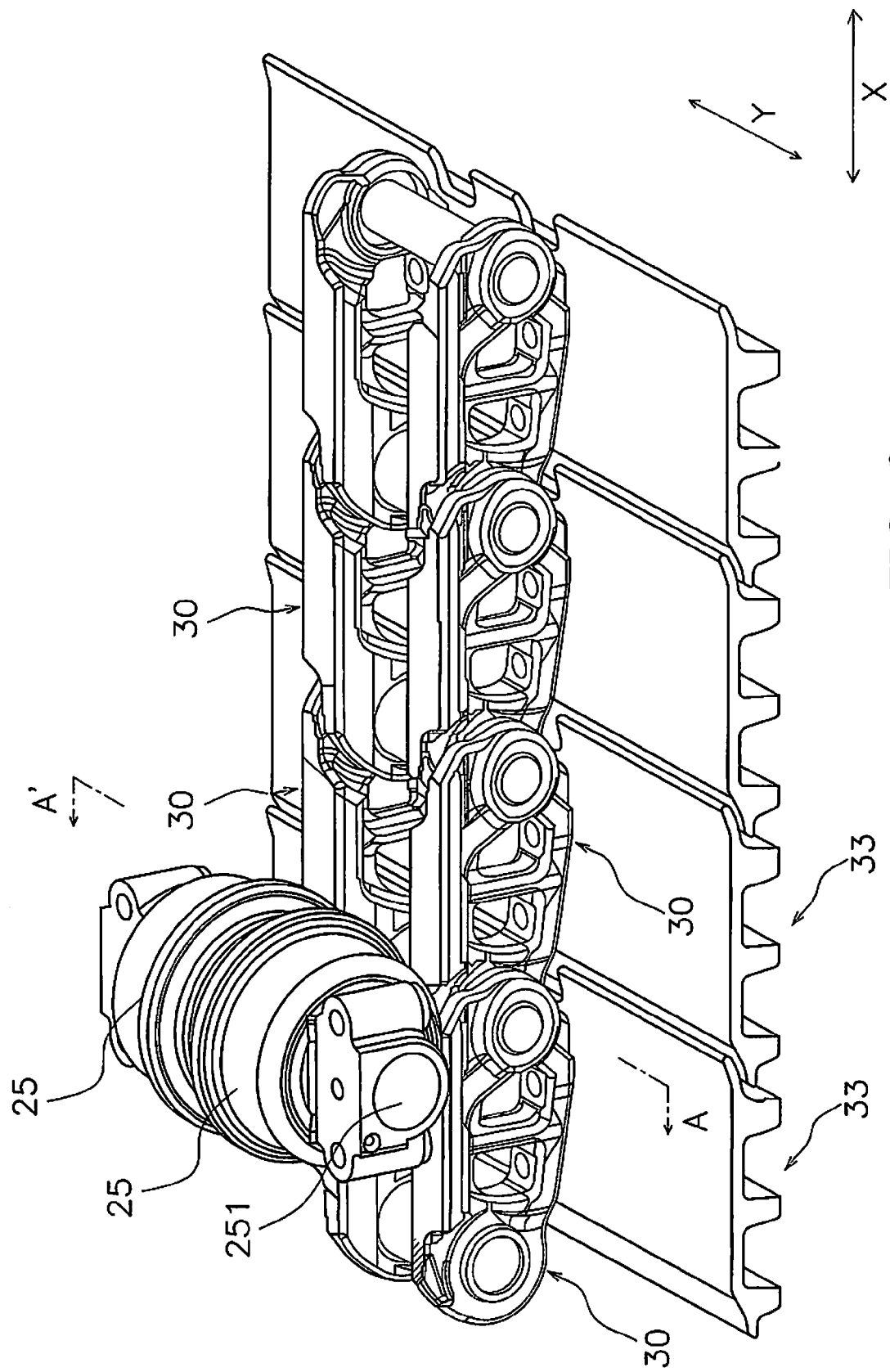
FIG. 3 is an oblique view of the track and track roller in FIG. 2A.
Figure 4:
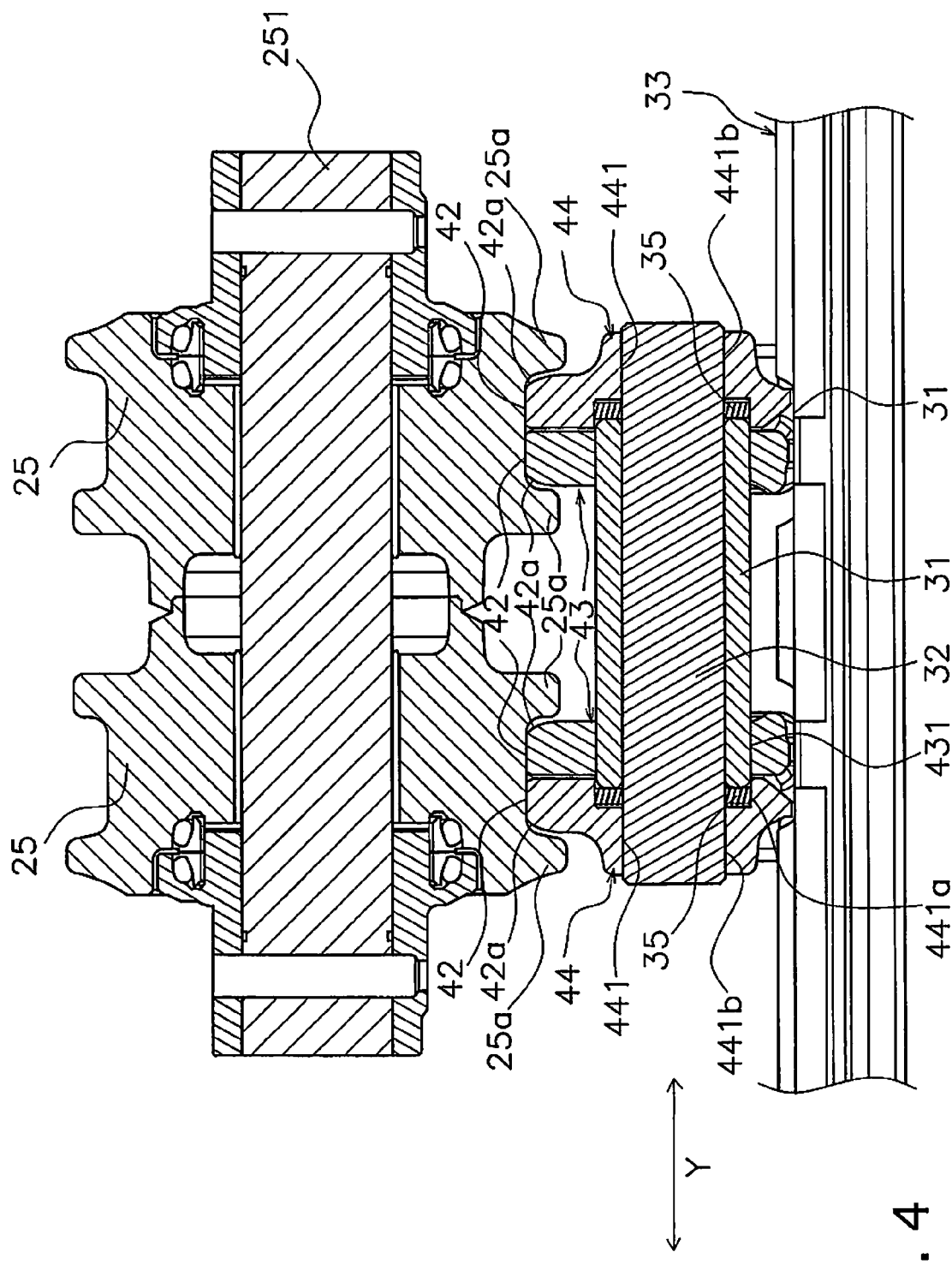
FIG. 4 is a cross section along the AA' line in FIG. 3.

FIG. 2A is an oblique view of the track 20. FIG. 2B is an exploded oblique view of FIG. 2A. FIG. 3 is a partial oblique view of the track 20, and shows a state in which the track rollers 25 are turning. FIG. 4 is a cross section along the AA' line in FIG. 3.

As shown in FIGS. 2A and 2B, the track 20 mainly has track links 30, bushings 31, link pins 32, track shoes 33, bolt members 34b and nut members 34a, and seal members 35. The track 20 is configured by attaching the track shoes 33 to the track links 30 and linking up the track links 30 to form an endless loop.

The track shoes 33 are mounted to shoe surfaces 41 (described in detail below) of the track links 30 by fastening the bolt members 34b and the nut member 34a together. Through-holes 331 are formed in the track shoes 33, and through-holes 48 are formed in the track links 30. The bolt members 34b are inserted into the through-holes 331 and the through-holes 48 from the track shoe 33 side and fastened to the nut members 34a disposed on seat surfaces 47s of the track links 30.

As shown in FIGS. 2A and 2B, two track links 30 are disposed side by side in the width direction of the vehicle body for each track shoe 33. The two track links 30 are formed to be in line symmetry. The two track links 30 aligned in the width direction are each linked to others to form two rows of loops. As shown in FIG. 4, with the linked track links 30 that are adjacent in a single row, the bushing hole 431 of one track link 30 and the pin hole 441 of the other track link 30 are disposed opposite each other.

The bushing 31 has a cylindrical shape and is press-fitted into the bushing hole 431 of one of the track links 30. As shown in FIG. 4, the seal members 35 are disposed at the base of the bushing 31, and are disposed in a large-diameter part 441a of the pin hole 441 of the track link 30.

The connecting pin 32 is inserted inside the bushing 31 and press-fitted into the pin hole 441 of the other track link 30. The track links 30 of the respective rows are disposed at both ends in the width direction of the bushing 31 and the connecting pin 32 so that the two rows of track links 30 are linked together.

In this manner, one track link 30 is linked to another track link 30 by the bushing hole 431 and the pin hole 441. In FIG. 2, the linking direction of the track links 30 is labeled X, and a direction perpendicular to the linking direction X is labeled the width direction Y. The linking direction X can also be called the direction facing the pin hole 441 from the bushing hole 431, or facing the bushing hole 431 from the pin hole 441, in one track link 30.

As shown in FIGS. 3 and 4, the track rollers 25 are disposed on the opposite side from the track shoes 33, with the track links 30 in between. Two track rollers 25 are disposed side by side in the vehicle width direction, and two track rollers 25 are rotatably supported by a rotating shaft 251. Each of the track rollers 25 abuts the track link 30 in that row. As will be discussed in detail below, a tread surface 42 is formed on the opposite side from the shoe surface 41 of the track link 30, and the track rollers 25 rotate in contact with the tread surface 42. The track rollers 24 rotate in the same way.

1-2. Crawler Belt Links

FIGS. 5A and 5B are oblique views of the track link 30 from one row. FIG. 6A is a front view of the track link 30, and FIG. 6B is a rear view of the track link 30. FIG. 6C is a top view of the track link 30, and FIG. 6D is a bottom view of the track link 30. FIG. 6E is a right side view of the track link 30, and FIG. 6F is a left side view of the track link 30. FIG. 7A is a cross section along the BB' line in FIG. 6A, and FIG. 7B is a cross section along the CC' line in FIG. 6A. FIGS. 7C and 7D are detail views of FIG. 6A.

Figure 5:
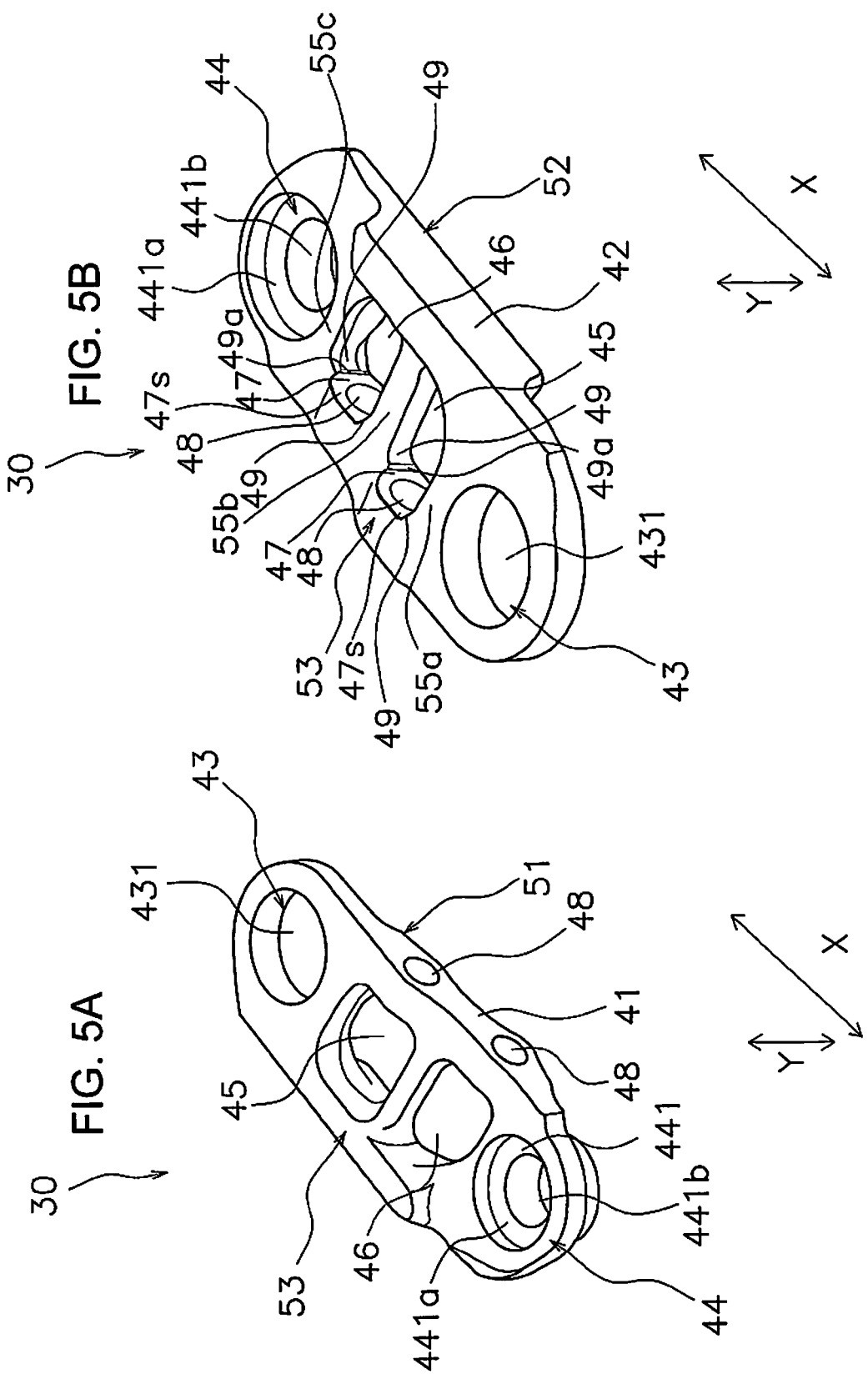
FIGS. 5A and 5B are oblique views of the track link in FIG. 2A.
Figure 6:
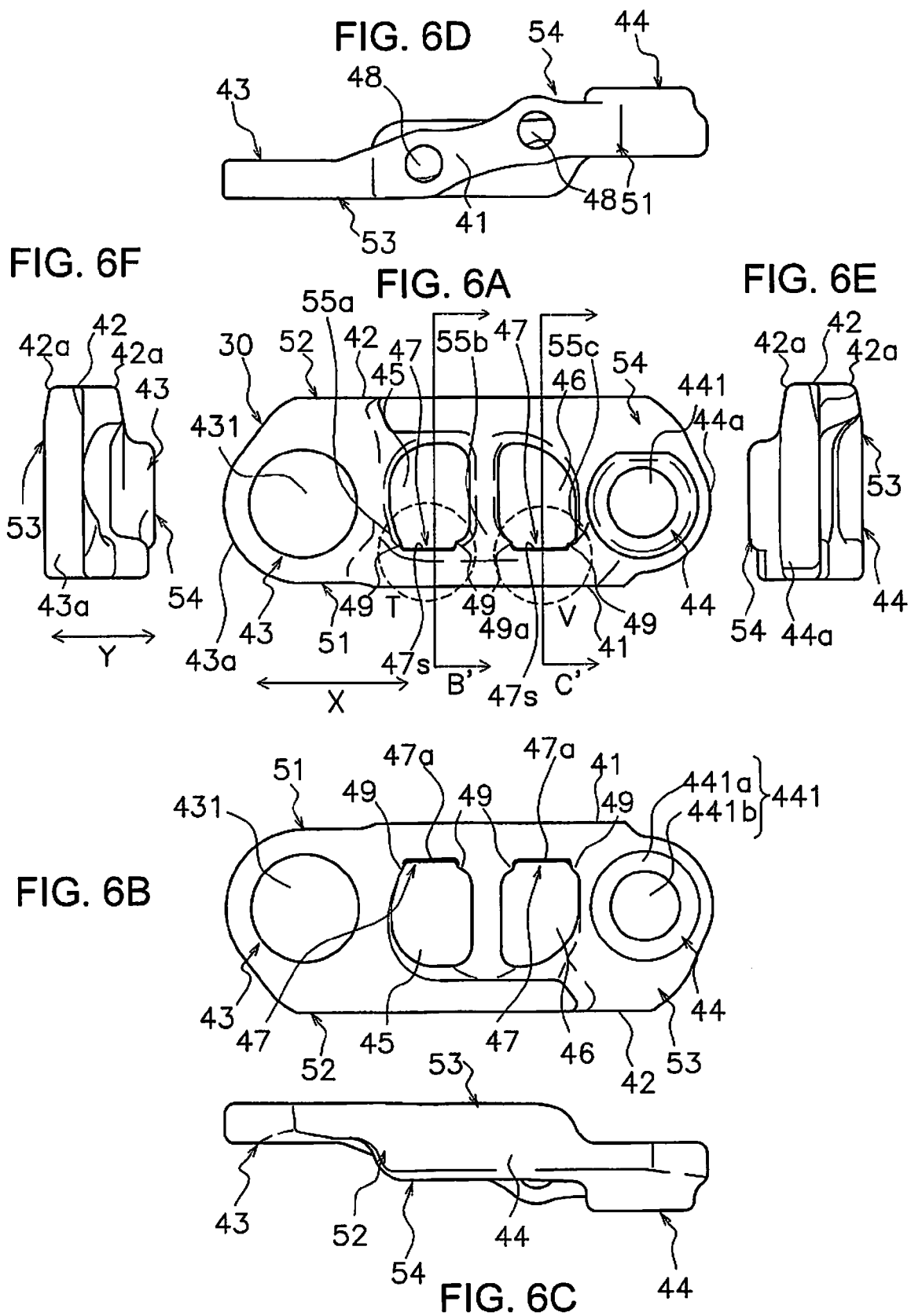
FIG. 6A is a front view of the track link in FIG. 5A.
FIG. 6B is a rear view of the track link in FIG. 5A.
FIG. 6C is a top view of the track link in FIG. 5A.
FIG. 6D is a bottom view of the track link in FIG. 5A.
FIG. 6E is a right side view of the track link in FIG. 5A.
FIG. 6F is a left side view of the track link in FIG. 5A.

As shown in FIGS. 5 and 6, the track link 30 in this embodiment is a substantially elliptical member that is curved at both ends, and mainly has a shoe surface 41, a tread surface 42, a first linking part 43, a second linking part 44, a first communicating part 45, a second communicating part 46, seat formation parts 47, and through-holes 48.

The shoe surface 41 is formed on a first face part 51 located on the outer side when the track links 30 linked in a loop. The shoe surface 41 is a flat surface, and two through-holes 48 are formed in it. Corners 41a and 41b at both ends in the width direction Y of the shoe surface 41 are formed in a rounded shape as shown in FIGS. 7A and 7B. In a state in which the track links 30 shown in FIG. 2 are disposed in two rows, if we let the portion facing inward be a first side face part 53, and the portion facing outward be a second side face part 54, the corner 41a is located on the second side face part 54 side, and the corner 41b is located on the first side face part 53 side.

The tread surface 42 is formed on a second face part 52 located on the inner side of the loop when the track links 30 are linked into a loop. The tread surface 42 comes into contact with the idler wheel 22, the carrier rollers 24, and the track rollers 25 as discussed above. The corners 42a at both ends in the width direction Y of the tread surface 42 are formed in a rounded shape as shown in FIGS. 7A and 7B.

The first linking part 43 and the second linking part 44 are formed at both ends in the linking direction X of the track link 30.

The first linking part 43 has the bushing hole 431 formed along the width direction Y. The bushing hole 431 is formed passing through the second side face part 54 from the first side face part 53. The end face 43a of the first linking part 43 in the linking direction X is curved so as to have a substantially annular shape along the bushing hole 431 in the front view in FIG. 6A.

The second linking part 44 is provided with the pin hole 441, which passes through in the width direction Y from the first side face part 53 to the second side face part 54. The end face 44a in the linking direction X of the second linking part 44 is curved so as to have a substantially annular shape along the pin hole 441 in the front view in FIG. 6A. As shown in FIGS. 5 and 6B, the large-diameter part 441a and a small-diameter part 441b are provided to the pin hole 441, and the large-diameter part 441a is formed on the first side face portion 53 side. A seal member 35 is fitted to the large-diameter part 441a.

The track links 30 are formed such that, in a state in which the track links 30 are disposed in two rows as shown in FIG. 2A, the second linking part 44 is located more to the outside than the first linking part 43, based on the space between the two rows of links in the width direction Y.

The first communicating part 45 and the second communicating part 46 are formed so as to penetrate from the first side face part 53 to the second side face part 54 and are spaces communicating both sides sandwiching the track link 30 (the first side face part 53 side and the second side face part 54 side). The first communicating part 45 and the second communicating part 46 are formed between the tread surface 42 and the shoe surface 41, and aligned between the first linking part 43 and the second linking part 44.

A seat formation part 47 is formed on the shoe surface 41 side of the first communicating part 45. A seat formation part 47 is also formed on the shoe surface 41 side of the second communicating part 46. The seat formation parts 47 have seat surfaces 47s on which the nut members 34a shown in FIG. 2A are disposed, and stepped parts 49.

In this embodiment, the seat surfaces 47s indicate the portions of the seat formation parts 47 where the nut members 34a are disposed, and the seat formation parts 47 shall be understood to include the surrounding area thereof. The through-holes 48 are formed passing through from the shoe surface 41 to the seat formation parts 47. More precisely, the through-holes 48 are formed passing through between the seat surfaces 47s and the shoe surface 41. The above-mentioned bolt members 34b are inserted into these through-holes 48 through the track shoe 33 in FIG. 2B, and the bolt members 34b are threaded into the nut members 34a disposed on the seat surfaces 47s, thereby attaching the track shoe 33 to the shoe surface 41.

As shown in FIGS. 5B and 6A, the stepped parts 49 are formed in a stepped shape at the seat surfaces 47s so as to prevent the rotation of the bolt members 34b. The stepped parts 49 are formed from the walls 55a and 55b on both sides in the linking direction X of the first communicating part 45 toward the through-holes 48. Also, the stepped parts 49 are formed from the walls 55a and 55b on both sides in the linking direction X of the second communicating part 46 toward the through-holes 48. The wall 55a is the inner edge portion of the bushing hole 431 in the first linking part 43. The wall portion 55b is the portion separating the first communicating part 45 from the second communicating part 46. The wall portion 55c is the inner edge portion of the pin hole 441 in the second linking part 44.

Thus forming the stepped parts 49 on both sides flanking the through-holes 48 in the linking direction X restricts rotation even if the nut members 34a try to rotate, so the stepped parts 49 function as detents.

As shown in FIG. 7C, the corner 49a formed on the through-hole 48 side of the stepped parts 49 in the first communicating part 45 is formed in a rounded shape. Also, as shown in FIG. 7D, the corner 49a formed on the through-hole 48 side of the stepped parts 49 in the second communicating part 46 is formed in a rounded shape. Thus rounding the corner 49a reduces the stress concentration at the corner 49a during heat treatment in the course of manufacture.

As shown in FIG. 7A, which is a cross section across the first communicating part 45, and FIG. 7B, which is a cross section across the second communicating part 46, the corners 47a and 47b at both ends in the width direction Y of the seat formation parts 47 provided on the shoe surface 41 side of the first communicating part 45 and the second communicating part 46, respectively, are formed in a rounded shape. The corner 47a is the place where the seat formation part 47 and the first side face part 53 intersect. The corner 47b is the place where the seat formation part 47 and the second side face part 54 intersect. The corner 47a indicates the first side face part 53 side of the seat formation part 47, and the corner 47b indicates the second side face part 54 side of the seat formation part 47.

This rounded shape allows reduces the stress concentration at the corners 47a and 47b during heat treatment in the course of manufacture.

Figure 7:
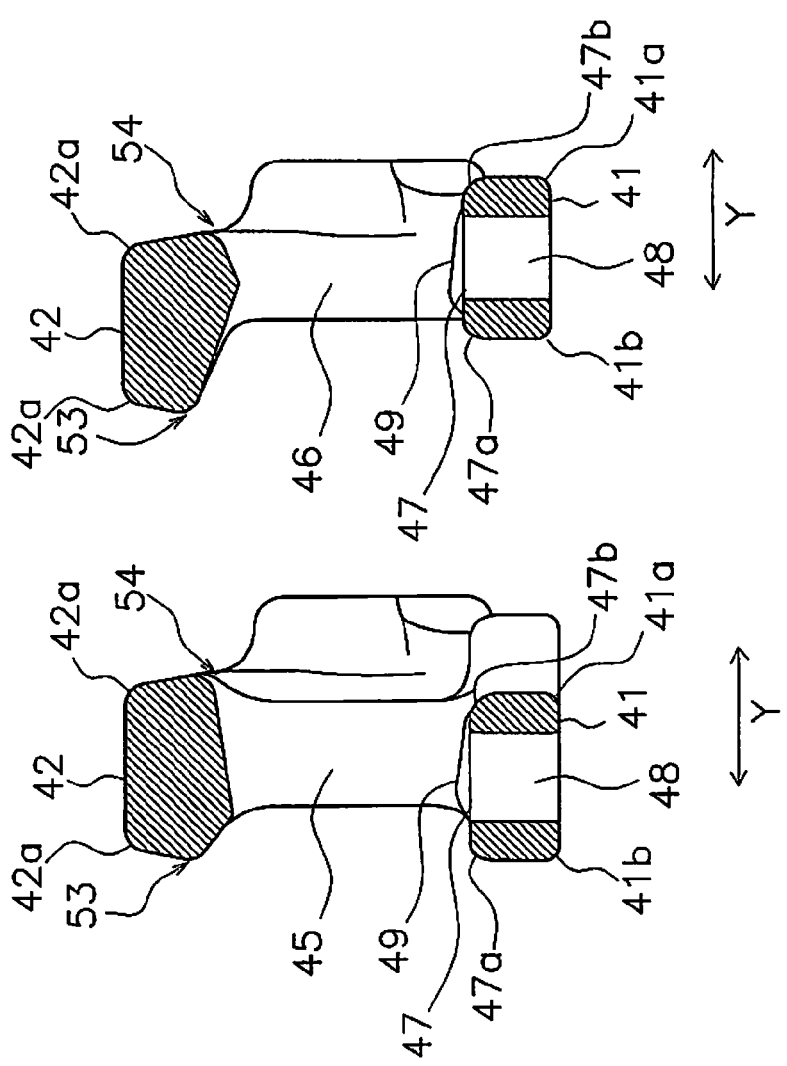
FIG. 7A is a cross section along the BB' line in FIG. 6A.
FIG. 7B is a cross section along the CC' line in FIG. 6A.
FIG. 7C is a detail view of FIG. 6A.
FIG. 7D is a detail view of FIG. 6A.

The track link 30 illustrated in FIGS. 6 and 7 shows the track link in the left row in FIG. 4, and the track link 30 in the right row in FIG. 4 is formed symmetrically with the track in the left row.

As shown in FIG. 4, in the two track links 30 adjacent to each other in one row, the first linking part 43 of one track link 30 is disposed to the inside of the second linking part 44 of the other track link 30. It can also be said that the bushing hole 431 of one track link 30 is disposed opposite the inside of the pin hole 441 of the other track link 30. The bushing 31 is then press-fitted into the bushing hole 431 located on the inside, and the link pin 32 inserted into the bushing 31 is press-fitted into the small-diameter part 441b of the pin hole 441 located on the outside. The seal members 35 are disposed at the large-diameter part 441a of the pin hole 441.

Also, protrusions 25a that protrude around the peripheral direction are formed at both ends in the width direction Y of the track rollers 25. That is, two protrusions 25a of one track roller 25 are disposed so as to flank the two tread surfaces 42 of the adjacent track links 30 from both sides. Consequently, the track rollers 25 can rotate without coming away from the tread surfaces 42. Here, the corners 42a at both ends in the width direction Y of the tread surface 42 of the track link 30 are formed in a rounded shape as shown in FIGS. 7A and 7B. Rounding the corners 42a at both ends of the tread surface 42 in this way prevents the protrusions 25a from being scratched or worn down.

2. Method for Manufacturing Crawler Belt Link

Figure 8:
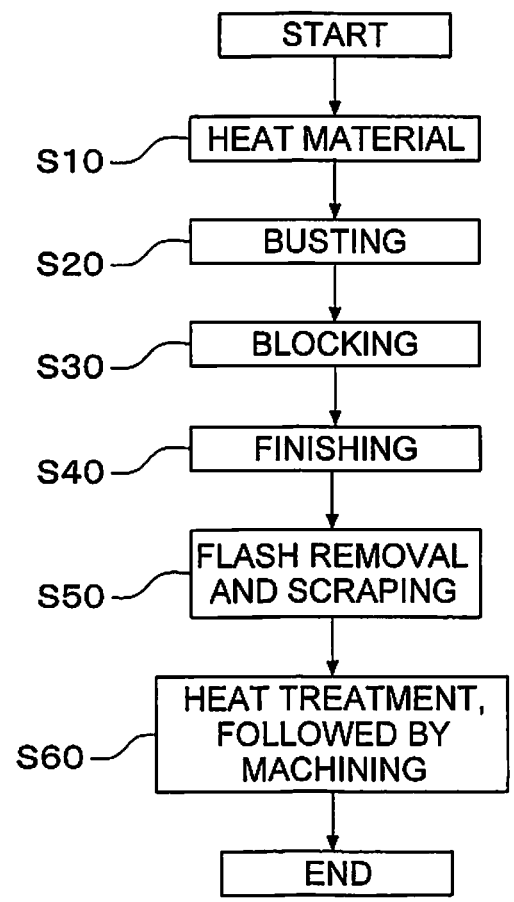
FIG. 8 is a flowchart showing a method for manufacturing the track link in FIG. 2A.

The method for manufacturing the above-mentioned track link 30 will now be described. FIG. 8 is a flowchart of the method for manufacturing the track link in this embodiment.

2-1. Overview of Manufacturing Method

First, in step S10, a round bar-like material is heat treated, for example. Manganese-boron steel is used as the material.

Next, in step S20, the heated rod material is bust in a die installed in a press or other such forging machine so as to approximate the rough shape of the track link 30.

Next, in step S30, blocking is performed on the bust material with a block impression die, bringing the material closer to the shape of the track link 30. In this blocking, the block impression die is installed in a press or other forging machine and forming is performed.

Then, in step S40, finishing is performed on the block material. An upper die 60a and a lower die 60b (discussed below) are installed in a forging machine such as a press, and finishing is performed to produce a molded article 61. The forming process from busting to finishing forms flash 62 at the parting plane between the upper and lower dies.

Next, in step S50, a trimming die 80 is used to remove the flash 62 (discussed below) and scrape the seat surfaces 47s'.

Next, in step S60, the molded article that has undergone flash removal and scraping is subjected to heat treatment in order to increase the hardness of the seat surfaces 47s' or the like, and machining is performed to form the through-holes 48, thereby producing the track link 30.

2-2. Finish

In this embodiment, the shaping is divided up into three parts: upsetting, preforming, and finish, with a die being used for each. Because the three steps gradually move closer to the shape of the track link 30, the dies used for upsetting, preforming, and finish become increasingly finer. In the following description, shaping will be described by using finish as an example.

2-2-1 Die

Figures 9B, 9C:
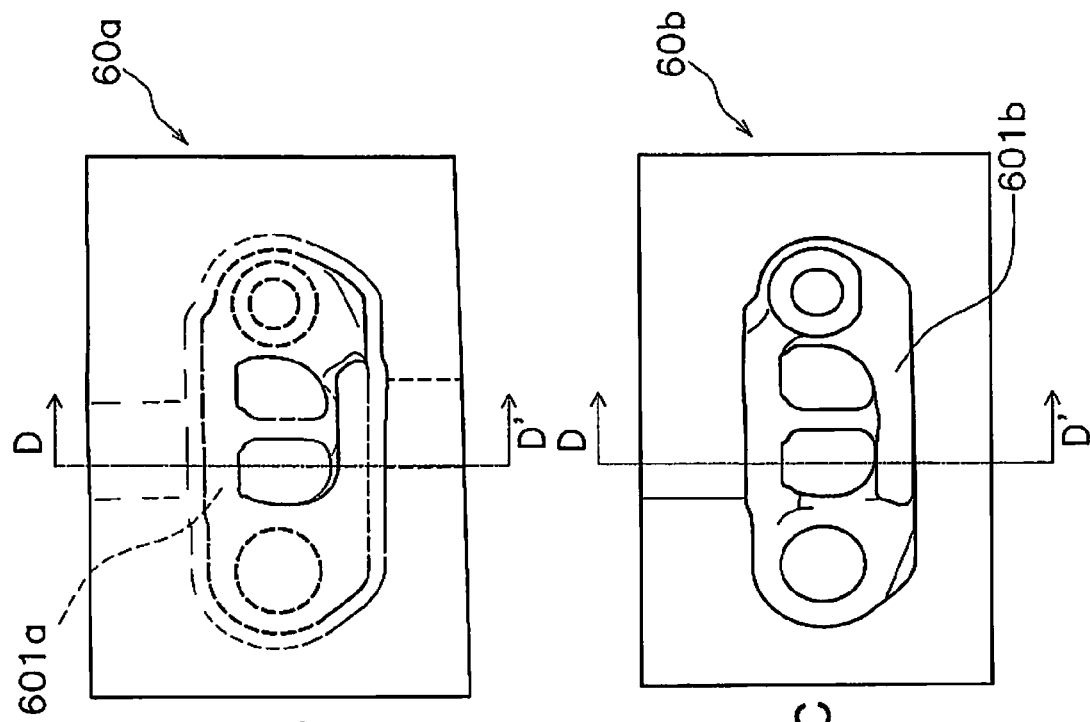
FIG. 9B is a plan view of the upper die in FIG. 9A.
FIG. 9C is a plan view of the lower die in FIG. 9A.
Figure 9A:
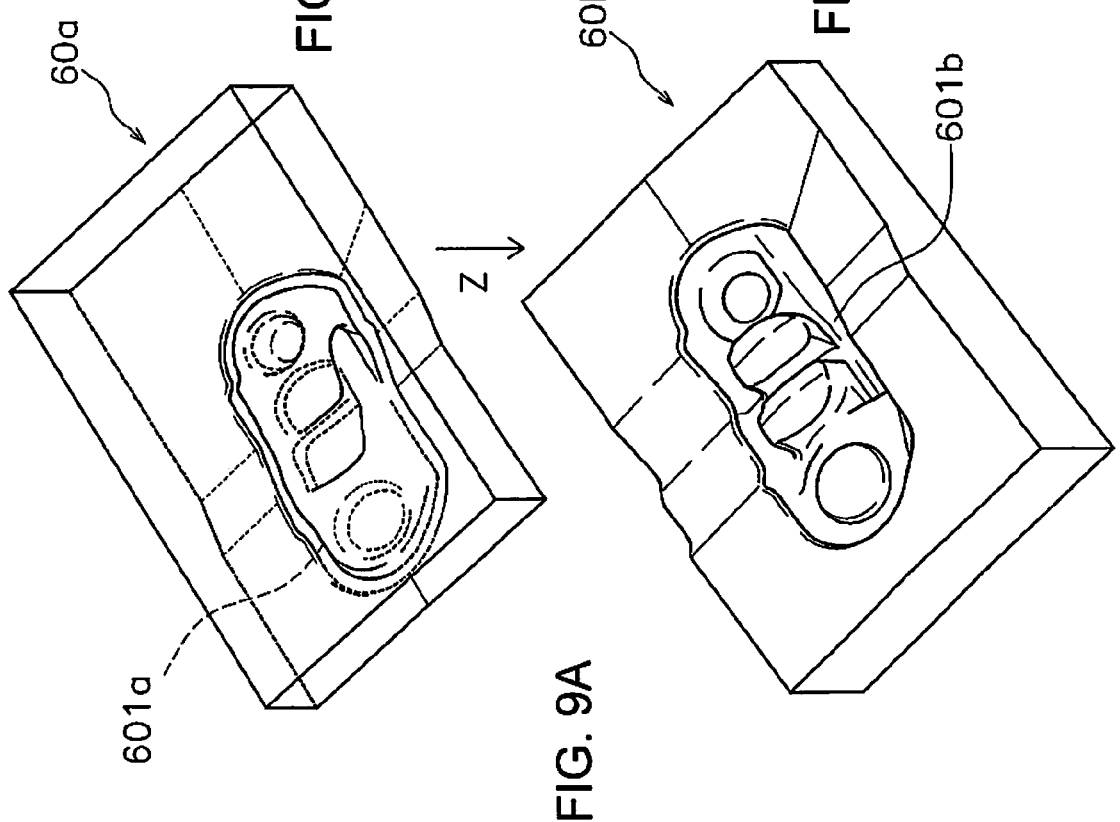
FIG. 9A is an oblique view of the die used in the manufacturing method in FIG. 8.

FIG. 9A is an oblique view of the upper die 60a and lower die 60b used for finish. FIG. 9B is a plan view of the upper die 60a, and FIG. 9C is a plan view of the lower die 60b. FIG. 9B is a view of the upper die 60a from above.

The molded article after preforming is placed on the lower die 60b, the upper die 60a is lowered vertically (the arrow Z direction) toward the lower die 60b, and pressing is performed between the upper die 60a and the lower die 60b to perform finish and produce the finished-shaped molded article 61.

Figure 10A:
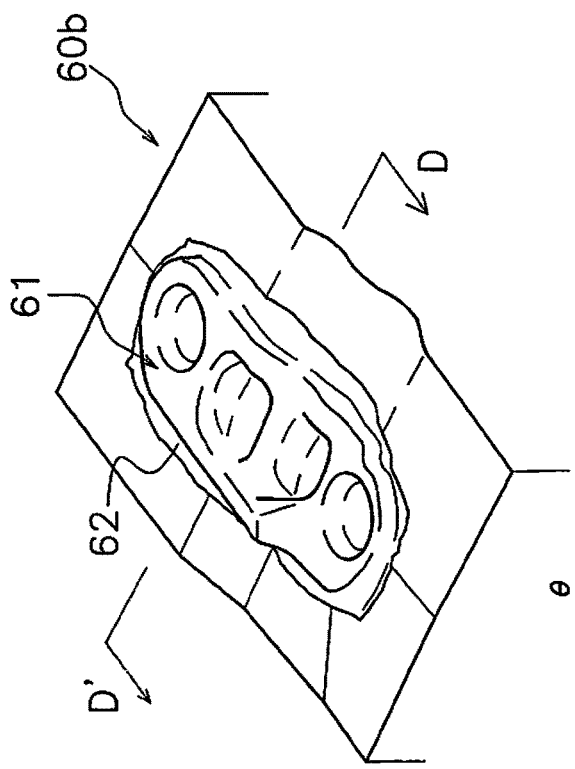
FIG. 10A is a diagram in which the upper die is not depicted in the finish shaping in FIG. 8.
Figure 10B:
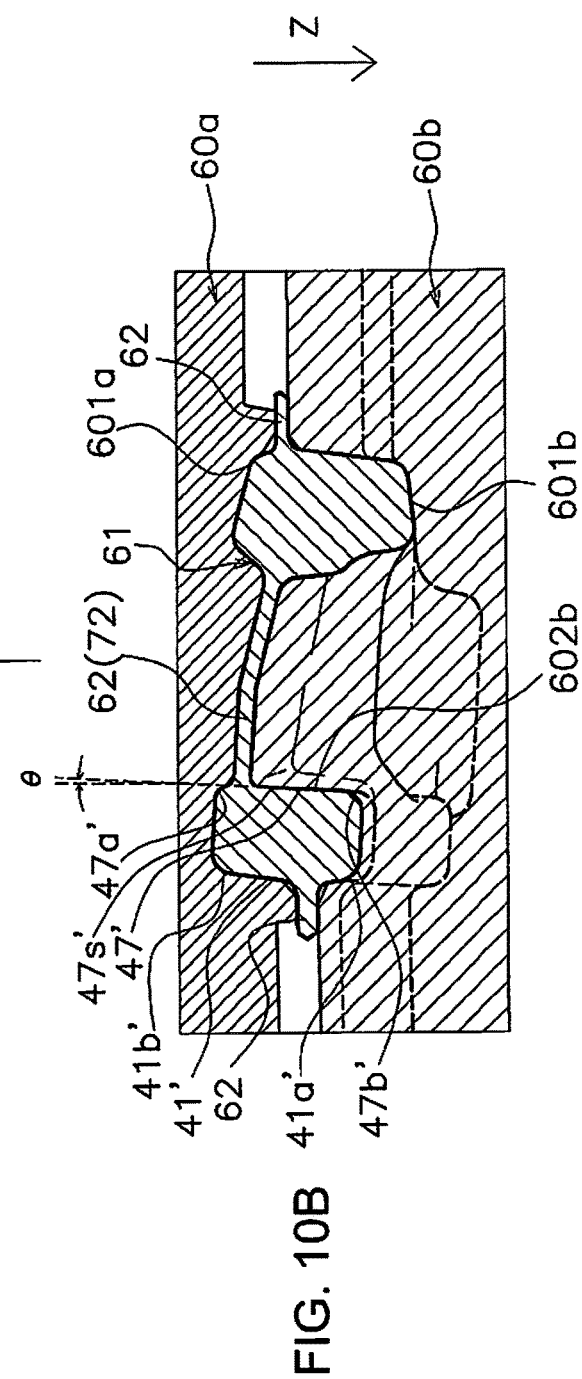
FIG. 10B is a cross section along the DD' line in FIG. 10A.

FIG. 10A shows a state in which the upper die 60a has been removed from the state during pressing. FIG. 10B is a cross section of the pressing state, and is a cross section along the DD' line in FIG. 9B.

A lower mold 601b formed in the lower die 60b mainly forms the second side face part 54 of the track link 30. An upper mold 601a formed in the upper die 60a mainly forms the first side face part 53 of the track link 30.

Here, the portions of the molded article 61 formed in the track link 30 (the completed product) are labeled by adding a prime sign to the numbers labeling the constituent parts of the track link 30. That is, the molded article 61 includes a track link 30' (more precisely, the portion where the track link 30 is formed) and the flash 62.

In the molding step, the molded article 61 is formed at an angle to the pressing direction of the forging (arrow Z). The seat surfaces 47s' shown in FIG. 10B is formed at an angle of four degrees to the vertical direction. That is, the seat formation face 602b of the lower die 60b for forming the seat surface 47s' is formed at an angle of four degrees to the pressing direction (arrow Z) (see θ in FIG. 10B). This inclination is provided from rough shaping.

Thus, the seat surface 47s' can be produced in plane without having to form a draft by molding the seat formation face 602b in an oblique direction with respect to the pressing direction (arrow Z). The angle of inclination is not limited to four degrees, and may be any angle that does not require the formation of a draft.

Also, the portions of the upper die 601a and lower die 601b corresponding to the corners 47a' and 47b' are formed in a curve so that the corners 47a' and 47b' at both ends in the width direction Y of the seat surface 47s' will have a rounded shape.

Consequently, the corners 47a' and 47b' at both ends in the width direction Y of the seat surface 47s' are formed in a rounded shape by molding.

2-2-2. Shape of Molded Article

The shape of the molded article 61 after finish shaping will now be described.

Figure 11D:
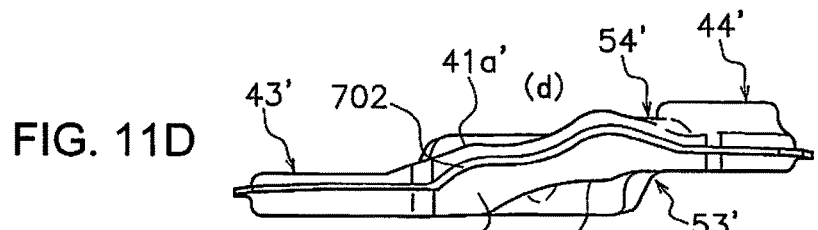
FIG. 11D is a bottom view of the molded article, FIG. 11E a right side view of the molded article.
Figures 11A, 11E, 11F:
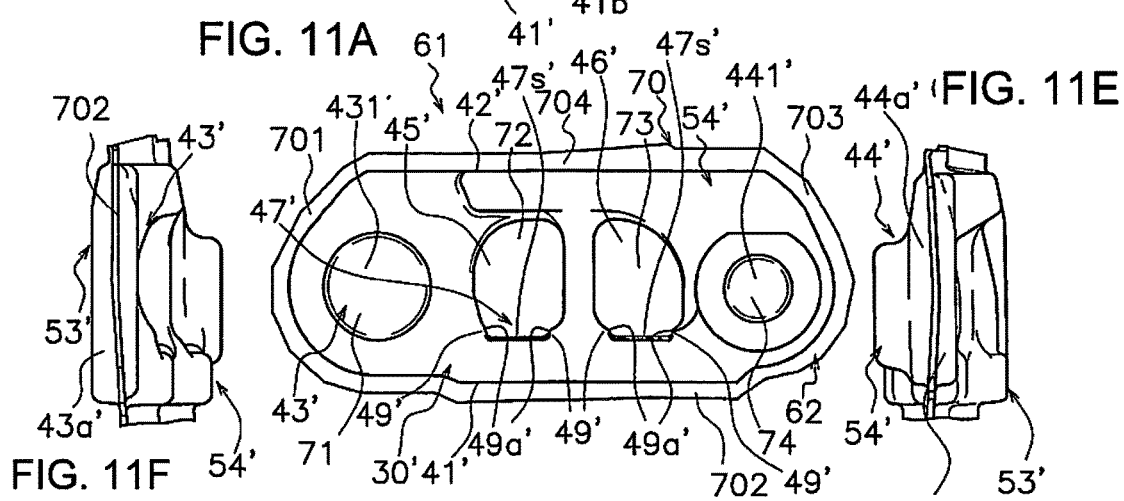
FIG. 11A is a front view of the molded article produced by the shaping in FIG. 10B.
FIG. 11F is a left side view of the molded article.
Figure 11B:
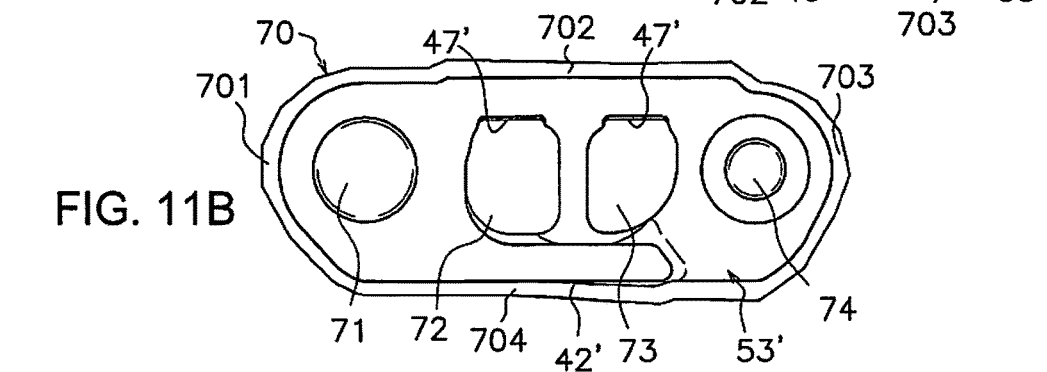
FIG. 11B is a rear view of the molded article.
Figure 11C:
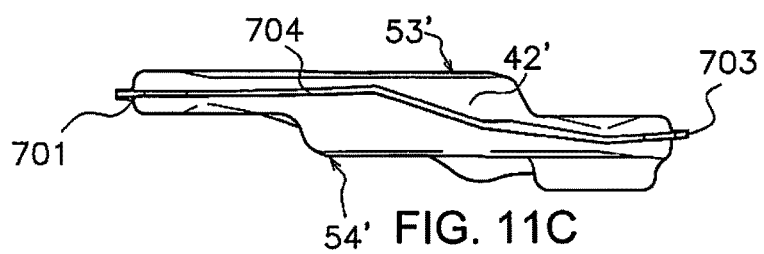
FIG. 11C is a top view of the molded article.

FIG. 11A is a front view of the molded article 61 after finish shaping, FIG. 11B is a rear view of the molded article 61, FIG. 11C is a top view of the molded article 61, FIG. 11D is a bottom view of the molded article 61, FIG. 11E is a right side view of the molded article 61, and FIG. 11F is a left side view of the molded article 61. FIG. 11A to FIG. 11F correspond to FIGS. 6A to 6F, respectively.

Flash 62 is formed on the molded article 61 along the parting surface between the upper die 60a and the lower die 60b in finish shaping (see FIG. 10A). The flash 62 is constituted by an outer peripheral flash portion 70 formed around the outer edge of the track link 30', and by a first inner flash portion 71, a second inner flash portion 72, a third inner flash portion 73, and a fourth inner flash portion 74 that are formed in the holes.

As shown in FIG. 11A, the outer peripheral flash portion 70 is constituted by a first outer peripheral flash portion 701 formed around the outer periphery of a first linking part 43' of the track link 30', a second outer peripheral flash portion 702 formed on a shoe surface 41', a third outer peripheral flash portion 703 formed around the outer periphery of a second linking part 44', and a fourth outer peripheral flash portion 704 formed on a tread surface 42'.

As shown primarily in FIGS. 11F, 11C, and 11D, the first outer peripheral flash portion 701 is formed so as to pass through the approximate center in the width direction Y of the end face 43a' of the first linking part 43'. As shown in FIG. 11D, the second outer peripheral flash portion 702 is formed to conform to the shape of the corner 41a', and closer to the corner 41a' at the end on the second side face part 54' side on the shoe surface 41'. The corner on the opposite side from the corner 41a' is shown as the corner 41b'.

As shown in FIGS. 11E, 11C, and 11D, the third outer peripheral flash portion 703 is formed as to pass through the approximate center in the width direction Y of the end face 44a' of the second linking part 44'. As shown in FIG. 11C, the fourth outer peripheral flash portion 704 is formed on the tread surface 42', and bent so as to pass through the approximate center in the width direction Y.

The parting surface between the upper die 60a and the lower die 60b used in the finish shaping is formed so that the outer peripheral flash portion 70 will be formed as above.

Thus, the outer peripheral flash portion 70 is formed so as not to pass the corners at both ends in the width direction Y, and to pass to the inside of the corners at both ends. Therefore, the corners at both ends in the direction Y of the track link 30' can be formed in a rounded shape by forming a curved shape at the positions of the upper die 60a and the lower die 60b corresponding to the corners at both ends in the width direction of the track link 30'.

As shown in FIGS. 11A and 11B, the first inner flash portion 71 is formed in a bushing hole 431', the second inner flash portion 72 is formed in a first communicating part 45', the third inner flash portion 73 is formed in a second communicating part 46', and the fourth inner flash portion 74 is formed in a pin hole 441'.

FIG. 12A is an oblique view of the molded article 61, and FIG. 12B is a cross section along the EE' line in FIG. 12A. FIG. 12C is a cross section along the FF' line in FIG. 12A, and FIG. 12D is a cross section along the GG' line in FIG. 12A.

As shown in FIG. 12D, the first inner flash portion 71 is formed in the approximate center in the width direction Y of the bushing hole 431'.

As shown in FIG. 12B, the fourth inner flash portion 74 is formed in the approximate center in the width direction Y of a small-diameter portion 441b' of the pin hole 441'.

As shown in FIG. 12C, the second inner flash portion 72 is formed closer to the corner 47a' on the first side face part 53' side, out of the corners 47a' and 47b' at both ends in the width direction Y of the seat formation part 47'.

The third inner flash portion 73 is similar to the second inner flash portion 72 in that the third inner flash portion 73 is formed closer to the corner 47a' on the first side face part 53' side, out of the corners 47a' and 47b' at both ends in the width direction Y of the seat formation part 47'.

The second inner flash portion 72 and the third inner flash portion 73 can also be said to be formed near the rounded corner 47a'.

As shown in FIG. 11A, stepped parts 49' are also formed by forging, and the corners 49a' of the stepped parts 49' are formed in a rounded shape by forging.

The flash 62 discussed above is removed in the subsequent flash removal step.

2-3. Flash Removal and Scraping

The flash removal step and scraping step will now be described in detail. Flash removal and scraping are performed with a trimming die 80. FIG. 13A is a diagram of the state when the molded article 61 has been placed in the trimming die 80. The trimming die 80 has a second die 82 that supports the molded article 61, and a first die 81 that moves from top to bottom to remove the flash 62. FIG. 13B is an oblique view of the second die 82 shown in FIG. 13A, as seen from the back side of the paper.

(a) Second Die

The second die 82 has a plate-like member 820, a placement space 821, and a support frame 822. As shown in FIG. 13B, the placement space 821 is a space formed in an oval shape in the middle of the plate-like member 820, is formed to match the shape of the track link 30', and has the molded article 61 placed therein. The support frame 822 is formed around the placement space 821 and supports the outer peripheral flash portion 70 from below. The support frame 822 is formed in an irregular shape from the plate-like member 820 in order to support the molded article 61 so that the seat surface 47s' of the molded article 61 will be disposed in the vertical direction.

The support frame 822 is constituted by a first support frame part 822a, a second support frame part 822b, a third support frame part 822c, and a fourth support frame part 822d. The first support frame part 822a is the edge of the curved portion of the oval placement space 821, and is formed flush with the plate-like member 820. The first support frame part 822a mainly supports the first outer peripheral flash portion 701.

The second support frame part 822b protrudes in an undulating shape from the substantially straight edge of the oval placement space 821. The second support frame part 822b supports the second outer peripheral flash portion 702 formed on the shoe surface 41' of the molded article 61.

The third support frame part 822c is the edge of the curved portion of the oval placement space 821, is formed to protrude from the plate-like member 820, and the height of the third support frame part 822c from the plate-like member 820 is uniform. The third support frame part 822c supports the third outer peripheral flash portion 703.

The fourth support frame part 822d is formed at an angle on the substantially straight edge of the oval placement space 821, so that its height from the third support frame part 822c decreases. The fourth support frame part 822d supports the fourth outer peripheral flash portion 704 formed on the tread surface 42' of the molded article 61.

(b) First Die

The first die 81 has an outer peripheral part 810, a first punch 811, a second punch 812, a third punch 813, and a fourth punch 814.

The outer peripheral part 810 has a space 810a that matches the shape of the track link 30', in order to remove the outer peripheral flash portion 70 of the molded article 61. The outer peripheral flash portion 70 is cut off by being squeezed between the support frame 822 and the outer peripheral part 810.

The first punch 811 is a substantially cylindrical member that removes the first inner flash portion 71 and produces the bushing hole 431 of the track link 30.

The second punch 812 is a substantially cylindrical member that removes the second inner flash portion 72 and produces the first communicating part 45 of the track link 30.

The third punch 813 is a substantially cylindrical member that removes the third inner flash portion 73 and produces the second communicating part 46 of the track link 30.

The fourth punch 814 is a substantially cylindrical member that produces the small-diameter portion 441b of the pin hole 441 of the track link 30.

The second punch 812 and the third punch 813 will now be described.

Figure 14B:
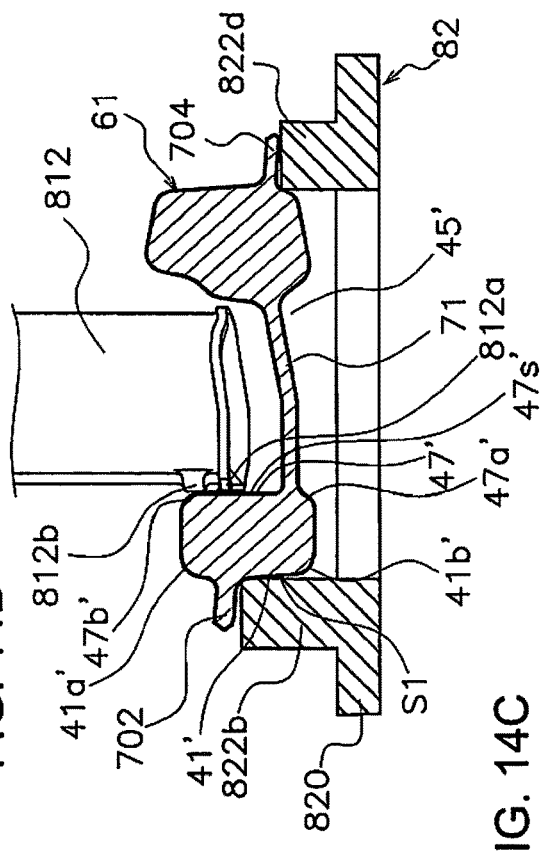
FIG. 14B is a cross section along the HH' line in FIG. 14A.
Figure 14A:
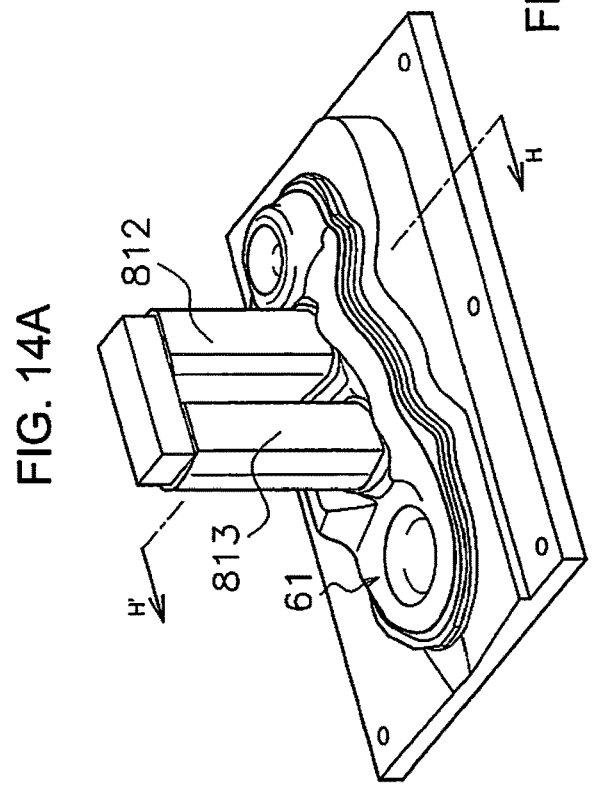
FIG. 14A is a diagram of a state in which a second punch member and a third punch member are inserted into the molded article in the burr removal and the scraping in FIG. 8.
Figure 14C:
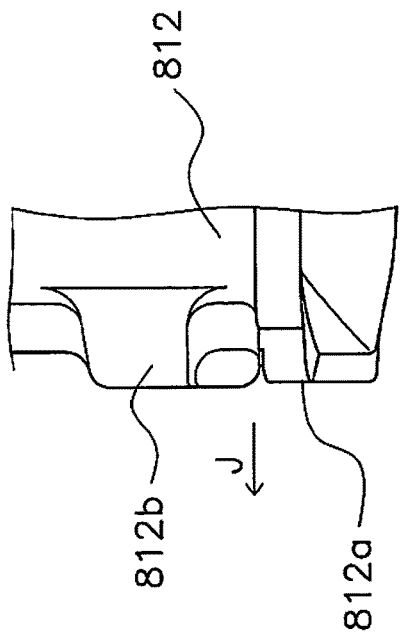
FIG. 14C is a detail view of the lower end portion of the second punch member in FIG. 14A.

FIG. 14A is a diagram showing a state in which the second punch 812 and the third punch 813 have been inserted into the molded article 61. FIG. 14B is a cross section along the HH' line in FIG. 14A. FIG. 14C is a detail view of the lower end portion of the second punch 812.

As shown in FIGS. 14B and 14C, a flash punching blade 812a is provided to the lower end of the second punch 812. Also, a scraping blade 812b is provided on the upper side of the flash punching blade 812a. The scraping blade 812b protrudes outward (see arrow J) beyond the flash punching blade 812a.

Since the scraping blade 812b protrudes more toward the seat surface 47S' than the flash punching blade 812a, the seat surface 47s' is scraped by scraping blade 812b. That is, scraping is carried out along with the flash punching. This scraping produces seat surfaces 47s with guaranteed accuracy.

The third punch 813 has the same configuration as the second punch 812.

Also, as shown in FIG. 14B, the molded article 61 is disposed so that the corner 41a' near the second outer peripheral flash portion 702 will be located on the first die 81 side, and the corner 41b' will be located on the second die 82 side.

In this scraping, a force is exerted in the thrust direction on the seat surfaces 47s', but with this embodiment, the second outer peripheral flash portion 702 is formed by the corner 41a' of the shoe surface 41' (the opposite side from the corner 41*b*' on the side where the second inner flash portion 72 is formed). Accordingly, a large surface area S1 can be ensured over which the second support frame part 822*b* and the shoe surface 41' are opposed, the molded article 61 can be supported against a force exerted in the thrust direction, and scraping can be carried out systematically.

3. Working Examples and Comparative Examples

Figure 15B:
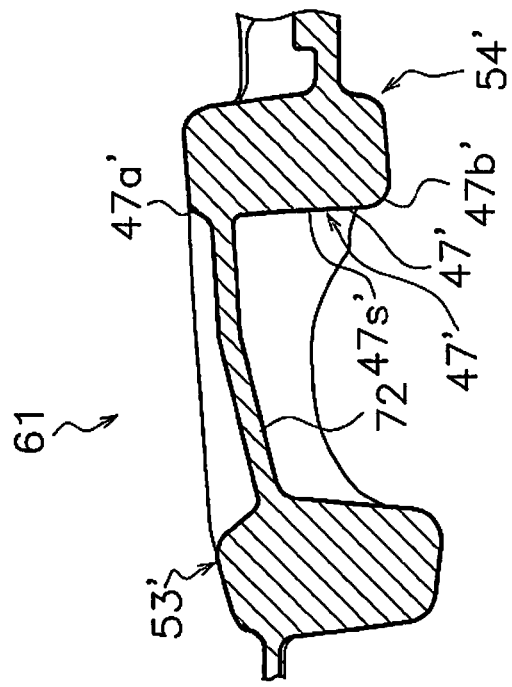
FIG. 15B is a cross section of the molded article in Embodiment 1.
Figure 15A:
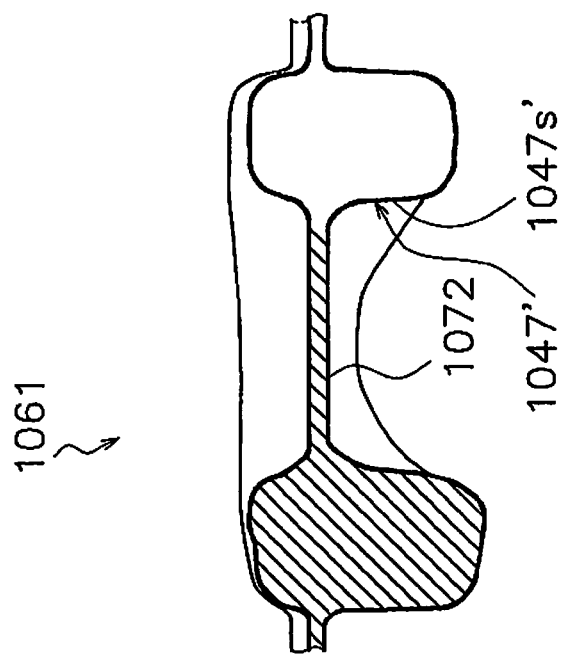
FIG. 15A is a cross section of a conventional molded article shaped with the pressing direction and the seat surface aligned with each other during forging.

FIG. 15A is a diagram of a conventional molded article 1061 formed by aligning the seat surfaces with the pressing direction during forging. FIG. 15B is a diagram of the above-mentioned molded article 61. FIG. 15A is a cross section corresponding to the FF' line in FIG. 12A. FIG. 15B is the same as FIG. 12C.

As shown in FIGS. 14A and 14B, the seat surface 47*s*' of the molded article 61 in this embodiment is inclined in the molding direction Z during molding, in contrast to the conventional article, so it can be formed in plane without having to form a draft as with the seat surface 1047*s*' of the convention molded article 1061.

Moreover, since there is no need for a draft, the location of the second inner flash portion 72 can be closer to the corner 47*a*', out of the corners 47*a*' and 47*b*' at both ends in the width direction Y of the seat formation part 47, so the planarity of the seat surface 47*s*' can be ensured.

Since the flash has been removed from the completed track link, the distinction between the position of flash on the seat surface of a conventional track link and that of the track link in this embodiment is hard to notice based on the external appearance, but the position of flash prior to removal can be identified by checking the grain flow formed along the outer shape of the molded article during molding by forging.

Figure 16B:
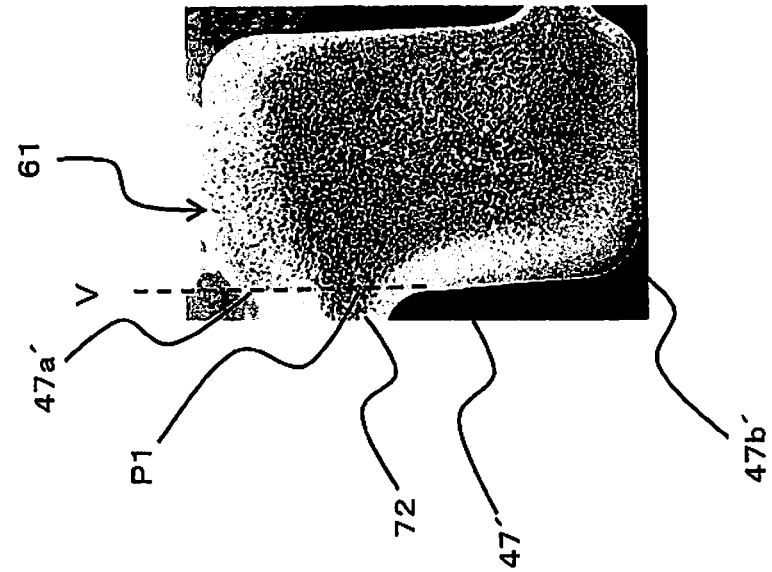
FIG. 16B is a cross sectional photograph of the vicinity of the seat formation part in the molded article of this embodiment.
Figure 16A:
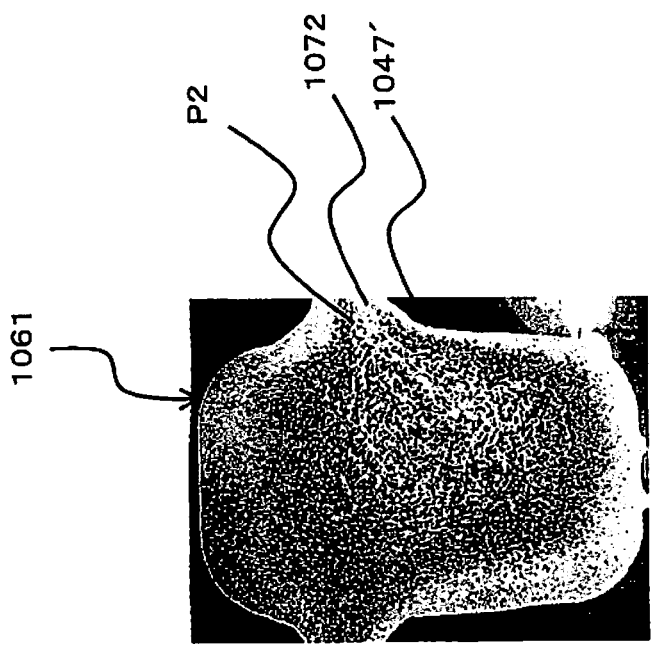
FIG. 16A is a cross sectional photograph of the vicinity of the seat formation part in the conventional molded article in FIG. 15A.

FIG. 16A is a cross sectional photograph of the vicinity of a seat formation part 1047' in the conventional molded article 1061, and FIG. 16B is a cross sectional photograph of the vicinity of the seat formation part 47' in the molded article 61 in this embodiment. As shown in FIG. 16B, with the molded article 61 in this embodiment, it can be confirmed that the grain flow goes toward a position P1 closer to the corner 47*a*' of the seat formation part 47'. It can also be seen from FIG. 16B that the texture flow intersects a dotted line V indicating the seat surface 47*s* after machining.

A comparison of FIG. 16B showing a conventional article confirms that, with the conventional molded article 1061 shown in FIG. 16A, the grain flow is toward a position P2 that is closer to the approximate center of the seat formation part 1047'.

4. Main Features, Etc.

4-1

The track links 30 of Embodiment 1 are linked in a loop for use in the track 20 of a hydraulic excavator or the like (an example of a work vehicle), and each comprise the tread surface 42, the shoe surface 41, the first communicating part 45 (an example of a communicating part), the second communicating part 46 (an example of a communicating part), the seat formation parts 47, and the through-holes 48. The tread surface 42 is in contact with the carrier rollers 24 (an example of a roller for an undercarriage) and the track rollers 25 (an example of a roller for an undercarriage). The shoe surface 41 is provided on the opposite side from the tread surface 42, and a track shoe 33 is attached thereto. The first communicating part 45 and second communicating part 46 are between the shoe surface 41 and the tread surface 42, pass through in the width direction Y that is perpendicular to the linking direction X, and allow the first side face part 53 (an example of a side face part) and the second side face part 54 (an example of a side face part) of the track link 30 to communicate in the width direction Y. The seat formation parts 47 are formed on the shoe surface 41 side of the first communicating part 45 and the second communicating part 46. The through-holes 48 pass through from the shoe surface 41 to the seat formation part 47, and the bolt members 34*b* are disposed therein. The seat formation parts 47 include seat surface 47*s* and stepped parts 49. The through-holes 48 are formed in the seat surfaces 47*s*, and nut members 34*a* which are fastened to the bolt members 34*b* are disposed on the seat surfaces 47*s*. The stepped parts 49 are formed opposite the seat surfaces 47*s* facing the through-holes 48 from either of the walls 55*a* and 55*b* provided on both sides of the first communicating part 45 in the linking direction X, and restrict the rotation of the nut members 34*a*. The corners 47*a* and 47*b* of the seat formation part 47 in the width direction Y, and the corner 49*a* on the seat surface 47*s* side of the stepped part 49 are formed in a rounded shape. A grain flow is formed toward the position P1 which is on the seat formation part 47 and is closer to the corner 47*a* (one of the corners 47*a* and 47*b*) at both ends of the seat formation part 47 in the width direction Y.

As shown in FIG. 6A and FIGS. 7A and 7B, the corner 49*a* of the stepped part 49 and the corners 47*a* and 47*b* in the width direction Y of the seat formation part 47 are formed in a rounded shape, which relieves the concentration of stress and reduces cracking, etc., during heat treatment.

Since the flash (the second inside flash portion 72 in FIG. 12C) is formed on the corner 47*a*' side in an oblique forming step of forging, the seat surfaces 47*s* in which the nut members 34*a* are disposed can be ensured, so no broaching needs to be performed afterward, and the manufacturing cost can be lowered.

4-2

With the track link 30 in this embodiment, the stepped parts 49 restrict the rotation of the nut members 34*a*.

The stepped parts 49 thus act was detents for the nut members 34*a*.

4-3

The method for manufacturing track links in this embodiment is a method for manufacturing track links that are used linked into a loop for use in a hydraulic excavator 100 (an example of a work vehicle), each having seat formation parts 47 that include seat surfaces 47*s* in which are disposed nut members 34*a* fixed to a track shoe 33, and being formed by forging, said method comprising a step S40 (an example of a formation step) and a step S50 (an example of a flash removal step).

As shown in FIG. 10B, in step S40 (an example of a formation step), the seat surfaces 47*s* are formed at an angle to the forging direction Z, at least the second inner flash portion 72 (an example of a flash portion) and the third inner flash portion 73 are formed on the seat formation parts 47' near the corner 47*a* (out of the corners 47*a*' and 47*b*' at both ends of the seat formation parts 47') in the width direction Y perpendicular to the linking direction X of the track link 30', producing a molded article 61 (an example of a track link material) in which the corners 47*a*' and 47*b*' at both ends are formed in a rounded shape. In step S50 (an example of a flash removal step), the molded article 61 (an example of a track link material) formed in step 40 (an example of a formation step) has some or all of its flash 62 removed.

As a result of thus inclining the forging direction Z with respect to the seat surfaces 47s' and also forming the second inner flash portion 72 and the third inner flash portion 73 near the corner 47a' at the end of the seat formation part 47', as shown in FIGS. 15A and 15B, unlike when the forging direction Z is made to coincide with the seat surface 1047s', there is no need for a draft in the seat surface portion, and no flash is formed on the seat surfaces 47s'. Accordingly, the seat surfaces 47s' can be formed in a plane. Also, no broaching needs to be performed after molding, and in this embodiment, for example, just scraping may be performed along with the flash removal, instead of broaching, and this lowers the cost.

4-4

In the method for manufacturing a track link in this embodiment, the trimming die 80 used in step S50 (an example of a flash removal step) has the flash punching blade 812a (an example of a flash removal blade) and the scraping blade 812b. The flash punching blade 812a removes the second inside flash portion 72 (an example of flash) on the seat formation parts 47. The scraping blade 812b scrapes the seat surfaces 47s'.

Since the flash removal step and the scraping can be carried out at the same time, manufacturing will take less time.

4-5

With the method for manufacturing a track link in the present embodiment, as shown in FIGS. 11D and 12C, the result of step S40 (an example of a formation step) is that the second outer peripheral flash portion 702 (an example of a flash part) is formed on the shoe surface 41' (which is in contact with the track shoe 33 and is the opposite face from the seat surfaces 47s'), closer to the corner 41a' (an example of a first corner) (out of the corner 41a' (an example of a first corner) and the corner 41b' (an example of a second corner) at both ends in the width direction Y of the shoe surface 41'. The trimming die 80 includes the first die 81 having the flash punching blade 812a (an example of a flash removal blade) and the scraping blade 812b, and the second die 82 corresponding to the first die 81. In step S50 (an example of a flash removal step), the molded article 61 (an example of a track link material) is disposed in the second die 82 so that the corner 41a' is located on the first die 81 side and the corner 41b' is located on the second die 82 side.

Thus forming the second outer peripheral flash portion 702 closer to one end side on the shoe surface 41', which is on the opposite side form the seat surfaces 47s', ensures a surface area S1 (see FIG. 14B) over which is supported the load in the thrust direction exerted on the seat surfaces 47s' during the scraping of the seat surfaces 47s'.

Embodiment 2

Next, the method for manufacturing a track link and the track link of a second embodiment pertaining to the present invention will be described.

The track link in Embodiment 2 differs from the track link in Embodiment 1 in the configuration of the site where rotation of the nut members is prevented. Therefore, the description will focus on how this Embodiment 2 differs from Embodiment 1.

1. Configuration

Figure 17A:
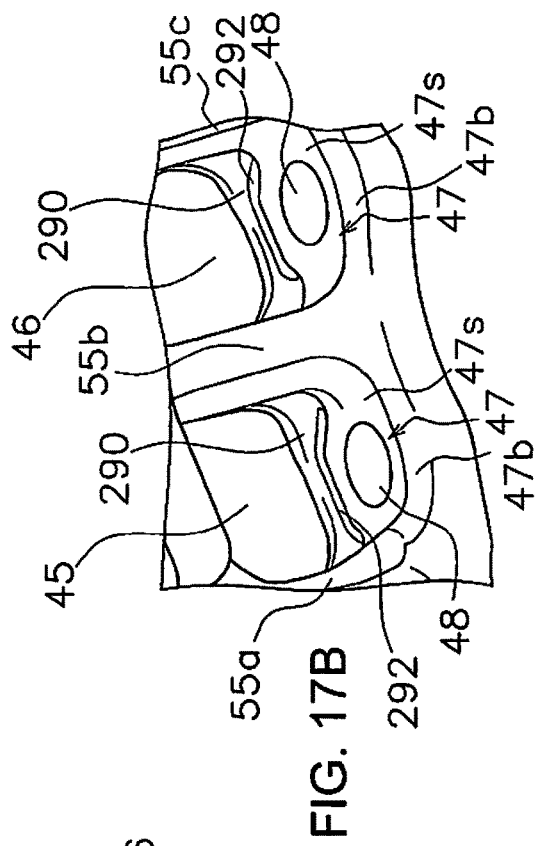
FIG. 17A is an oblique view of a track link in Embodiment 2 pertaining to the present invention.
Figure 17B:
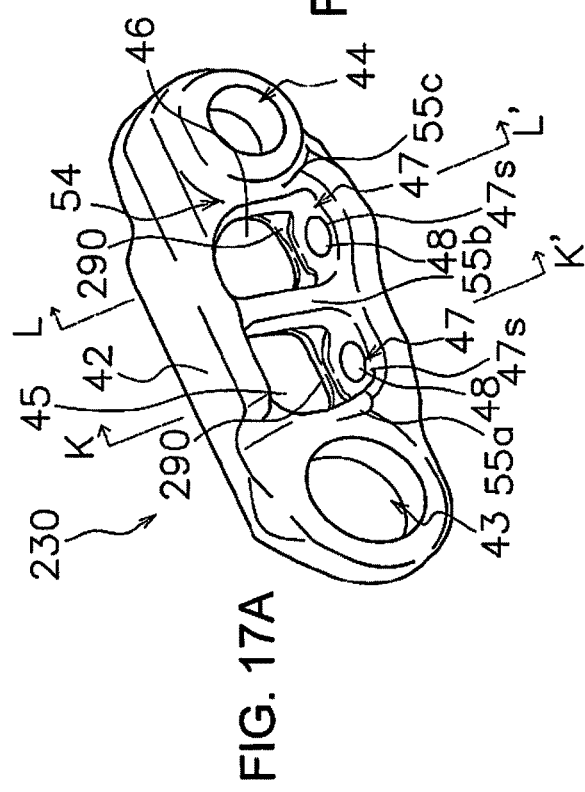
FIG. 17B is a detail view of the vicinity of the seat formation part in FIG. 17A.
Figure 17C:
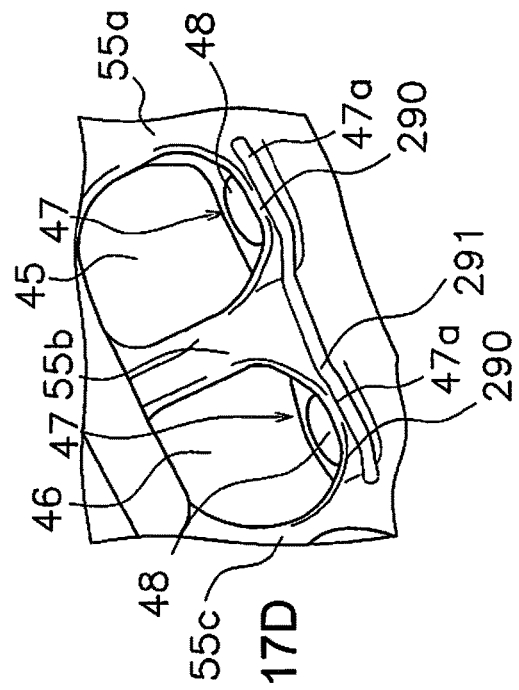
FIG. 17C is an oblique view of the track link in Embodiment 2 pertaining to the present invention.
Figure 17D:
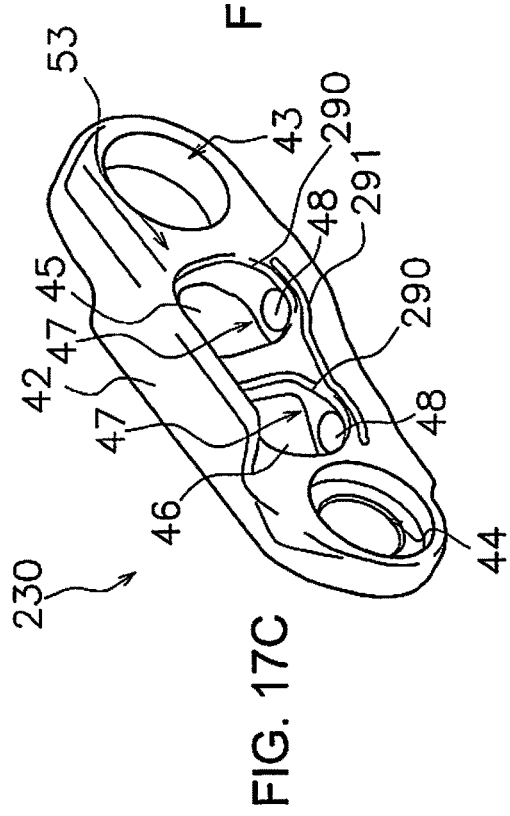
FIG. 17D is a detail view of the vicinity of the seat formation part in FIG. 17C.
Figure 18A:
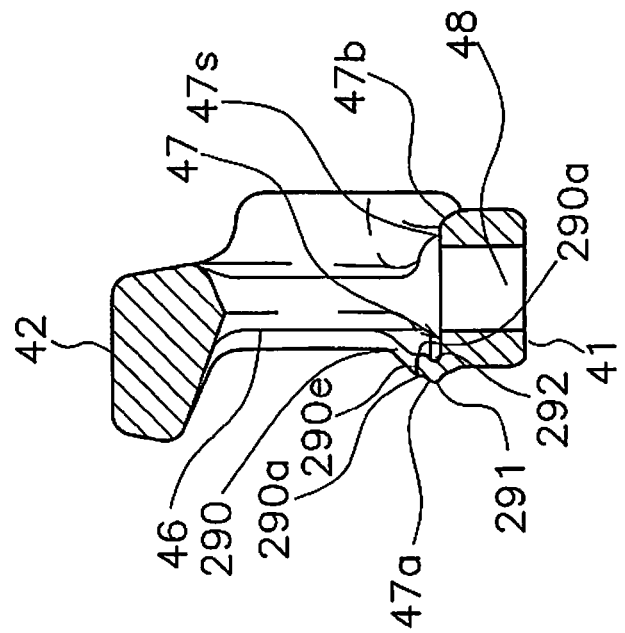
FIG. 18A is a cross section along the KK' line in FIG. 17A.

FIG. 17A is an oblique view of a track link 230 as seen from above on the second side face part 54 side. FIG. 17B is a detail view of the area near the seat formation part 47 in FIG. 17A. FIG. 17C is an oblique view of the track link 230 as seen from above on the first side face part 53 side. FIG. 17D is a detail view of the area near the seat formation part 47 in FIG. 17C. FIG. 18A is a cross section along the KK' line in FIG. 17A, and FIG. 18B is a cross section along the LL' line in FIG. 17A.

As shown in FIGS. 17 and 18, the track link 230 in this Embodiment 2 differs from the track links 30 in Embodiment 1 in that the track link 230 comprises bosses 290 that utilize flash, instead of the stepped parts 49.

The bosses 290 are formed on the seat formation parts 47, closer to the corner 47a on the second side face part 54 side of the seat formation part 47. The boss 290 is formed between the wall 55a and the wall 55b in the first communicating part 45. Also, the boss 290 is formed between the wall 55b and the wall portion 55c in the second communicating part 46.

Figure 18B:
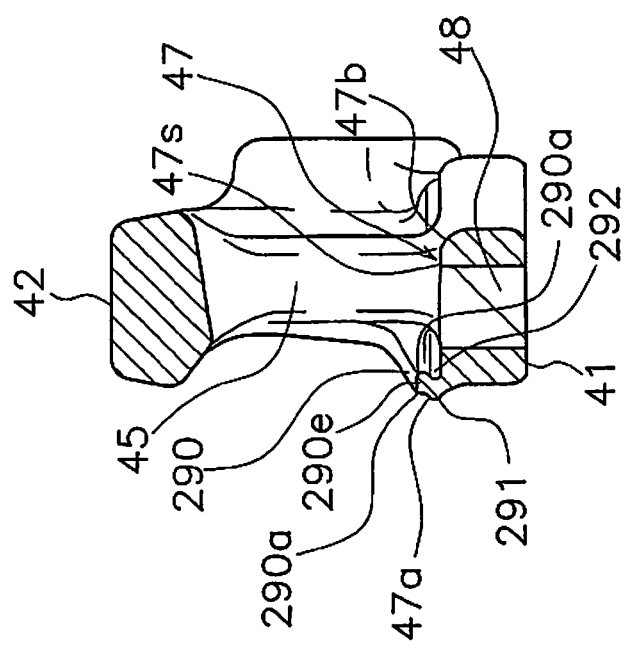
FIG. 18B is a cross section along the JJ' line in FIG. 17A.

As shown in FIGS. 18A and 18B, the corners 290a at both ends in the width direction Y of the edge 290e on the tread surface 42 side of the boss 290 are formed in a rounded shape, which relives the stress concentration.

A protrusion 291 is provided to the track link 230 so as to protrude outward from the boss 290. As shown in FIGS. 17C and 17D, the protrusion 291 is formed on the first side face part 53, from the seat formation part 47 of the first communicating part 45 to the seat formation part 47 of the second communicating part 46. Also, the corner 47a on the second side face part 54 side of the seat formation part 47 is formed in rounded shape and is part of the protrusion 291. That is, the boss 290 can be said to be formed on the seat formation part 47 and closer to the rounded corner 47a.

Also, as shown in FIG. 17B and FIGS. 18A and 18B, concave grooves traces 292 are formed on the inner side of the bosses 290 corresponding to the protrusions 291. The grooves traces 292 are traces of a groove formed by the accumulation of shavings in a groove formed in the molded article 261 (discussed below).

As discussed above, with the track link 230 in this Embodiment 2, since part of the flash is used to form the boss 290, the flash must be located more to the outside than in the Embodiment 1 to ensure the seat surfaces 47s. Therefore, the protrusion 291 is formed and the flash is moved more to the outside than in Embodiment 1.

2. Method of Manufacturing Crawler Belt Link

The method for manufacturing the track link of Embodiment 2 differs from Embodiment 1 in flash removal and scraping (step S50). Therefore, the description will focus on flash removal and scraping.

Figure 19:
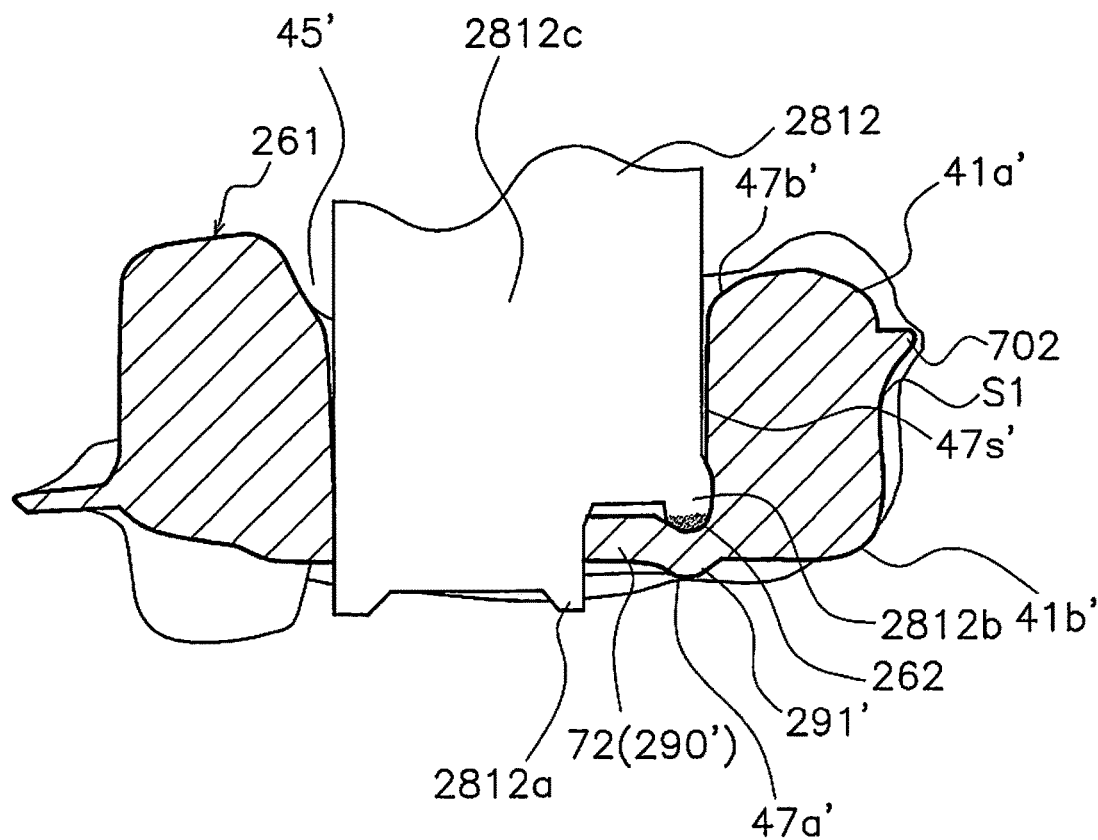
FIG. 19 is a diagram illustrating burr removal and scraping in the method for manufacturing a track link of FIG. 17A.

FIG. 19 is a diagram illustrating flash removal and scraping in Embodiment 2. FIG. 19 is a cross section at a position corresponding to FIG. 14B, but the viewing direction is reversed from that in FIG. 14B. A second punch 2812 in Embodiment 2 has a flash punching blade 2812a with a different shape from that of the flash punching blade 812a of the second punch 812 in Embodiment 1, in order to form the boss 290 by leaving a portion of the second inner flash portion 72. The second punch 2812 in Embodiment 2 has a cylindrical main body 2812c, a flash punching blade 2812a disposed on the lower side of the main body 2812c, and a scraping blade 2812b disposed on the lower side of the main body 2812c. The main body 2812c is formed in an outer shape that substantially matches the shape of the first communicating part 45. The flash punching blade 2812a has a smaller diameter than the main body 2812c so as to leave the boss 290. The scraping blade 2812b is disposed on the main body 2812c so as to be on the seat surface 47s' side of the molded article 261. Also, the scraping blade 2812b is located above the flash punching blade 2812a in the height direction.

When the second punch 2812 is inserted in the second inner flash portion 72, part of the second inner flash portion 72 is removed by the flash punching blade 2812a to form the first communicating part 45. Also, part of the second inner flash portion 72 is left behind to form boss 290'.

Scraping is performed by scraping the surface of the seat surface 47s' with the scraping blade 2812b. Shavings produced by scraping collect in the groove 262 of the molded article 261. The shavings accumulated in this groove 262 are integrated with the groove 262 by heat, forming the above-mentioned grooves traces 292.

Further, the corners 290a at both ends in the width direction Y of the boss 290 are subsequently formed in a rounded shape by machining.

The track link 230 of Embodiment 2 is produced by the above steps.

3. Key Features, Etc.

3-1

The track link 230 of Embodiment 2 is one of a number of track links that are linked into a loop for use in the track 20 of a hydraulic excavator or the like (an example of a work vehicle), and comprises the tread surface 42, the shoe surface 41, the first communicating part 45 (an example of a communicating part), the second communicating part 46 (an example of a communicating part), the seat formation parts 47, and the through-holes 48. The tread surface 42 is in contact with the carrier rollers 24 (an example of a roller for an undercarriage) and the track rollers 25 (an example of a roller for an undercarriage). The shoe surface 41 is provided parallel to the tread surface 42, and the track shoe 33 is attached thereto. The first communicating part 45 and the second communicating part 46 are between the shoe surface 41 and the tread surface 42, pass through in the width direction Y that is perpendicular to the linking direction X, and allow the first side face part 53 (an example of a side face part) and the second side face part 54 (an example of a side face part) of the track link 30 to communicate in the width direction Y. The seat formation parts 47 are formed on the shoe surface 41 side of the first communicating part 45 and the second communicating part 46. The through-holes 48 pass from the shoe surface 41 to the seat formation parts 47, and the bolt members 34b are disposed therein. The seat formation parts 47 have the seat surfaces 47s and the bosses 290. The seat surfaces 47s have the through-holes 48 formed in them, and the nut members 34a that are fastened to the bolt members 34b are disposed therein. The bosses 290 are provided on the seat formation parts 47, near the corner 47a, out of the corners 47a and 47b at both ends of the seat formation parts 47 in the width direction Y. The bosses 290 are formed from the walls 55a and 55b provided on both sides of the first communicating part 45 in the linking direction X. The bosses 290 are formed from the walls 55b and 55c provided on both sides of the second communicating part 46 in the linking direction X. The edges 290e of the bosses 290 and the corners 47a and 47b at both ends of the seat formation parts 47 are formed in a rounded shape. A grain flow is formed toward the position P1 near the corner 47a (one of the corners 47a and 47b at both ends of the seat formation parts 47 in the width direction Y) on the seat formation parts 47.

3-2

With the track link 30 in this embodiment, the bosses 290 restrict the rotation of the nut members 34a. Thus, the stepped parts 49 act as detents for the nut members 34a.

Thus rounding the corners 47a and 47b at both ends of the seat formation parts 47 and the edges 290e of the bosses 290 relieves the concentration of stress and reduces cracking and the like during heat treatment.

Also, the bosses 290 that prevent rotation of the nut members 34a can be formed by leaving part of the flash in the removal of the flash left behind in the formation step, so there is no need for broaching or other such machining to form the bosses 290, which keeps the manufacturing cost lower.

3-3

The track link 230 in Embodiment 2 further comprises the protrusion 291. The protrusion 291 is formed protruding outward from the bosses 290. The corner 47a near the bosses 290 of the seat formation parts 47 is formed is provided to the protrusion 291.

Thus rounding the corner 47a formed on the protrusion 291 relieves the concentration of stress.

3-4

The track link 230 in Embodiment 2 further comprises the grooves traces 292. The grooves traces 292 are formed on the inner side of the bosses 290 so as to correspond to the protrusion 291.

The grooves traces 292 are formed when the seat surface 47s' is scraped and the shavings produced by this scraping accumulate in the groove 262. Forming this groove 262 for holding the shavings allows the seat surfaces to be accurately scraped, without being affected by the shavings.

3-5

The method for manufacturing the track link 230 in Embodiment 2 is a method for manufacturing a number of track links that are linked into a loop for use in the hydraulic excavator 100 (an example of a work vehicle), each having seat formation parts 47 that include seat surfaces 47s in which are disposed nut members 34a that are fixed to a track shoe 33, said method comprising a step S40 (an example of a formation step) and a step S50 (an example of a flash removal step).

In step S40 (an example of a formation step), the seat surfaces 47s' are formed at an angle to the forging direction Z, at least the second inner flash portion 72 (an example of a flash portion) and the third inner flash portion 73 are formed on the seat formation parts 47' near the corner 47a (out of the corners 47a' and 47b' at both ends of the seat formation parts 47') in the width direction Y perpendicular to the linking direction X of the track link 30', producing a molded article 261 (an example of a track link material) in which the corners 47a' and 47b' at both ends are formed in a rounded shape. In step S50 (an example of a flash removal step), the molded article 261 (an example of a track link material) formed in step 40 (an example of a formation step) has some or all of its flash 62 removed.

As a result of thus inclining the forging direction Z with respect to the seat surfaces 47s' and also forming the second inner flash portion 72 and the third inner flash portion 73 near the corner 47a' at the end of the seat formation part 47', as shown in FIGS. 15A and 15B, unlike when the forging direction Z is made to coincide with the seat surfaces 1047s', there is no need for a draft in the seat portion, and no flash is formed on the seat surfaces 47s'. Accordingly, the seat surfaces 47s' can be formed in a plane. Also, no broaching needs to be performed after molding, and in this embodiment, for example, just scraping may be performed along with the flash removal, instead of broaching, and this lowers the cost.

3-6

In the method for manufacturing the track link 230 in Embodiment 2, the trimming die 80 used in step S50 (an example of a flash removal step) has the flash punching blade 2812a (an example of a flash removal blade) and the scraping blade 2812b. The flash punching blade 2812a removes the second inside flash portion 72 (an example of flash) on the seat formation parts 47. The scraping blade 2812b scrapes the seat surfaces 47s'.

Since the flash removal step and the scraping can be carried out at the same time, manufacturing will take less time.

3-7

With the method for manufacturing the track link 230 in Embodiment 2, in step S50 (an example of a flash removal step), part of the second inner flash portion 72 (an example of a flash portion) is left behind so as to restrict the rotation of the nut members 34a, and material scraped from the molded article 261 (an example of a track link material) by scraping collects in grooves 262 formed in a portion of the second inner flash portion 72 of the molded article 261 along the seat surfaces 47s'. Consequently, shavings produced by the scraping collect in the grooves 262. Thus forming the grooves 262 for collecting the shavings allows the seat surfaces to be scraped accurately, without being affected by the shavings.

3-8

With the method for manufacturing the track link 230 in Embodiment 2, in step S40 (an example of a formation step), the second outer peripheral flash portion 702 (an example of a flash portion) is formed on the shoe surface 41', which is in contact with the track shoe 33 and opposite the seat surfaces 47s', closer to the corner 41a' (an example of a first corner), out of the corner 41a' (an example of a first corner) and the corner 41b' (an example of a second corner) at both ends in the width direction Y of the shoe surface 41' (see FIG. 19). The trimming die 80 has a first die 81 having a flash punching blade 812a (an example of a flash removal blade) and a scraping blade 812b, and a second die 82 corresponding to the first die 81. In step S50 (an example of a flash removal step), the molded article 61 (an example of a track link material) is disposed in the second die 82 so that the corner 41a' is located on the first die 81 side and the corner 41b' is located on the second die 82 side.

Thus forming the second outer peripheral flash portion 702 closer to one end side on the shoe surface 41' that is on the opposite side from the seat surfaces 47s' ensures a surface area S (see FIG. 19) over which is supported the load in the thrust direction exerted on the seat surfaces 47s' during the scraping of the seat surface 47s'.

OTHER EMBODIMENTS

An embodiment of the present invention was described above, but the present invention is not limited to or by the above embodiment, and various modifications are possible without departing from the gist of the invention.

(A) Examples of a working vehicle include a hydraulic excavator, a bulldozer, a wheel loader, etc.

(B) In the above Embodiments 1 and 2, two seat surfaces and two communicating parts (the first communicating part 45 and the second communicating part 46) were formed, but just one communicating part may be formed, or three or more communicating parts may be formed.

(C) In Embodiment 1, in the first communicating part 45, the stepped parts 49 were formed from both of the walls 55a and 55b, but may be formed from just one or the other. In other words, the stepped part 49 should function as detents for the nut members 34a. Similarly, in the second communicating part 46, the stepped parts 49 may be formed only the wall 55b or 55c.

(D) With the track link 230 in Embodiment 2, the concave grooves traces 292 are visible, but the grooves 262 may be filled in with shavings so that the grooves traces are not visible. Also, the grooves traces 292 may be built up above the surface.

(E) In Embodiment 2, in the first communicating part 45, the boss 290 is formed all the way to the walls 55a and 55b, but may also be interrupted midway. In other words, the boss 290 should function as detents of the nut members 34a. Similarly, in the second communicating part 46, the boss 290 may be interrupted midway from the wall 55b to the wall 55c.

(F) In Embodiment 1 above, the stepped part 49 was provided to the seat formation part 47, and in Embodiment 2 the boss 290 was provided, with both functioning as detents for the nut members, but these are not the only options. For instance, curved surface 390 may be formed on the seat formation part 47, as with the track link 330 shown in the oblique view in FIG. 20A. FIG. 20B is a front view of the track link 330. FIG. 20C is a detail view of the area near the curved surface 390 of the first communicating part 45.

As shown in FIGS. 20A and 20B, the curved surfaces 390 is formed instead of the stepped parts 49 on the seat formation parts 47 of the track link 330. As shown in FIG. 20C, the curved surface 390 is provided on the inside of the first communicating part 45 so as to form part of an imaginary cylinder N having a center axis M along the width direction Y. Part (or all) of the curved surface 390 forms the seat surface 47s, and a through-hole 48 is provided thereto. The corners 47a and 47b (see FIG. 20A) at both ends in the width direction Y of the seat formation part 47 are formed in a rounded shape. A grain flow is formed toward a position near the corner 47a.

The track link 330 is produced with the forging direction at an angle to the seat surfaces 47s, just as in Embodiments 1 and 2.

FIGS. 21A and 21B are oblique views of a nut member 350 used in the track link 330. As shown in FIGS. 21A and 21B, the nut member 350 is in the approximate shape of a hexagonal prism, on the bottom face of which is formed a curved surface 350c that curves convexly downward. The curved surfaces 350c are formed so as to match the curved surfaces 390 of the seat formation parts 47 of the first communicating part 45 and the second communicating part 46. That is, in a state in which the nut members curved surface 350c are disposed on the seat surfaces 47s, the curved surfaces 350c are provided so as to form part of the side faces of imaginary cylinders N having a center axis M along the width direction Y.

In a state in which the nut member 350 is disposed on the seat surface 47s of the first communicating part 45, an opposing side face 350s disposed parallel to the center axis M is opposite the walls 55a and 55b. In a state in which the nut member 350 is disposed on the seat surface 47s of the second communicating part 46, the opposing side face 350s disposed parallel to the center axis M is opposite the walls 55b and 55c.

When the nut member 350 is mated with the seat surface 47d so that the curved surface 350c and the curved surface 390 are opposite each other, rotation of the nut member 350 is restricted when the curved surface 350c hits the curved surface 390 of the track link 330, and the side face 350s hits the walls 55a, 55b, and 55c.

The track link and the method for manufacturing a track link of the present invention have the effect of relieving the stress concentration, and as such are useful it that they can be used in work vehicles, etc.

The invention claimed is:

1. A track link, a number of which are linked in a loop shape for use in a track of a work vehicle, the track link comprising:
   a tread surface configured to come into contact with a roller for an undercarriage;
   a shoe surface disposed on an opposite side from the tread surface, and a track shoe being attachable to the shoe surface;
   a communicating part disposed between the shoe surface and the tread surface, the communicating part passing through the track link in a width direction that is perpendicular to a linking direction, and the communicating part being configured to allow side faces of the track link to communicate in the width direction; and
   a seat formation part formed on a shoe surface side of the communicating part;
   a through-hole passing through from the shoe surface to the seat formation part, and a bolt member being disposable in the through-hole,
   the seat formation part including
      a seat surface, the through-hole being formed in the seat surface, and a nut member that is linked to the bolt member being disposable on the seat surface, and
      a stepped part formed opposite the seat surface from at least one of the walls disposed on sides of the communicating part in the linking direction, toward the through-hole,
   corners at ends of the seat formation part in the width direction and a corner on a seat surface side of the stepped part being formed in rounded shapes, and
   a grain flow being formed toward a position on the seat formation part and near one of the corners at the ends of the seat formation part in the width direction.

2. The track link according to claim 1, wherein the stepped part restricts a rotation of the nut member.

3. A track link, a number of which are linked in a loop shape for use in a track of a work vehicle, the track link comprising:
   a tread surface configured to come into contact with a roller for an undercarriage;
   a shoe surface disposed on an opposite side from the tread surface, and a track shoe being attachable to the shoe surface;
   a communicating part disposed between the shoe surface and the tread surface, the communicating part passing through the track link in a width direction that is perpendicular to a linking direction, and the communicating part being configured to allow side faces of the track link to communicate in the width direction;
   a seat formation part formed on a shoe surface side of the communicating part; and
   a through-hole passing through from the shoe surface to the seat formation part, and a bolt member being disposable in the through-hole,
   the seat formation part including
      a seat surface, the through-hole being formed in the seat surface, and a nut member that is linked to the bolt member being disposable on the seat surface, and
      a boss formed on the seat formation part near one of a plurality of corners at ends of the seat formation part in the linking direction, the boss being formed from walls disposed on sides of the communicating part in the linking direction,
   the corners of the ends of the seat formation part and a corner of the boss being formed in rounded shapes, and
   a grain flow being formed toward a position on the seat formation part and near one of the corners at the ends of the seat formation part in the width direction.

4. The track link according to claim 3, wherein the boss restricts a rotation of the nut member.

5. The track link according to claim 3, further comprising a protrusion formed protruding outward from the boss, the corner near where the boss is formed on the seat formation part being disposed on the protrusion.

6. The track link according to claim 5, further comprising a groove trace formed on an inside of the boss so as to correspond to the protrusion.

7. A track link, a number of which are linked in a loop shape for use in a track of a work vehicle, the track link comprising:
   a tread surface configured to come into contact with a roller for an undercarriage;
   a shoe surface disposed on an opposite side from the tread surface, and a track shoe being attachable to the shoe surface;
   a communicating part disposed between the shoe surface and the tread surface, the communicating part passing through the track link in a width direction that is perpendicular to a linking direction, and the communicating part being configured to allow side faces of the track link to communicate in the width direction;
   a seat formation part including a curved surface shape so as to form part of a side face of an imaginary circular column having a center axis along the width direction, and the seat formation part being formed on a shoe surface side of the communicating part; and
   a through-hole passing through from the shoe surface to the seat formation part, and a bolt member being disposable in the through-hole,
   corners at ends of the seat formation part in the linking direction being formed in rounded shapes, and
   a grain flow being formed toward a position on the seat formation part and near one of the corners at the ends of the seat formation part in the width direction.

8. The track link according to claim 7, wherein the seat formation part includes a seat surface, and on a nut member that is fastened to the bolt member being disposed on the seat surface, and
   the nut member includes a shape such that a contact face of the nut member that contacts with the seat surface matches the curved surface shape.

* * * * *